(12) United States Patent
Krull et al.

(10) Patent No.: US 9,221,938 B2
(45) Date of Patent: Dec. 29, 2015

(54) POLYMERS CARRYING HYDROXYL GROUPS AND ESTER GROUPS AND METHOD FOR THE PRODUCTION THEREOF

(75) Inventors: Matthias Krull, Harxheim (DE); Roman Morschhaeuser, Mainz (DE); Hans Juergen Scholz, Alzenau (DE); Jochen Stock, Neuenburg (DE)

(73) Assignee: Clariant Finance (BVI) Limited, Tortola (VG)

( * ) Notice: Subject to any disclaimer, the term of this patent is extended or adjusted under 35 U.S.C. 154(b) by 359 days.

(21) Appl. No.: 13/977,326

(22) PCT Filed: Dec. 8, 2011

(86) PCT No.: PCT/EP2011/006174
§ 371 (c)(1),
(2), (4) Date: Jun. 28, 2013

(87) PCT Pub. No.: WO2012/089298
PCT Pub. Date: Jul. 5, 2012

(65) Prior Publication Data
US 2014/0200312 A1     Jul. 17, 2014

(30) Foreign Application Priority Data
Dec. 30, 2010 (DE) .......................... 10 2010 056 564

(51) Int. Cl.
*C08F 8/14* (2006.01)
*C08F 216/06* (2006.01)
*B01J 19/12* (2006.01)
*C08F 8/00* (2006.01)
*H05B 6/80* (2006.01)

(52) U.S. Cl.
CPC ............. *C08F 216/06* (2013.01); *B01J 19/126* (2013.01); *C08F 8/00* (2013.01); *C08F 8/14* (2013.01); *H05B 6/806* (2013.01); *B01J 2219/0884* (2013.01); *B01J 2219/0888* (2013.01); *B01J 2219/0892* (2013.01); *B01J 2219/1215* (2013.01); *B01J 2219/1227* (2013.01); *B01J 2219/1287* (2013.01); *C08F 2810/20* (2013.01)

(58) Field of Classification Search
CPC ........... C08F 8/14; C08F 16/06; C08F 216/06
USPC ....................................................... 525/61
See application file for complete search history.

(56) References Cited

U.S. PATENT DOCUMENTS

| 1,972,142 A | 9/1934 | Goldstein |
| 2,601,561 A | 6/1952 | Schertz |
| 3,024,260 A | 3/1962 | Ernst |
| 3,050,418 A | 8/1962 | Mendelsohn et al. |

(Continued)

FOREIGN PATENT DOCUMENTS

| CH | 681586 | 4/1993 |
| CN | 1228910 | 9/1999 |

(Continued)

OTHER PUBLICATIONS

International Search Report for PCT/EP2007/008681 Mail dated Jan. 29, 2008.

(Continued)

*Primary Examiner* — Edward Cain
(74) *Attorney, Agent, or Firm* — Tod A. Waldrop

(57) ABSTRACT

The invention relates to polymers carrying ester/hydroxyl groups, containing repetitive structural units of formulae (I) and (II) in a block-wise, alternating or statistical sequence, wherein D represents a direct bond between the polymer backbone and the hydroxyl group, a $C_1$- to $C_6$-alkene group, a $C_5$- to $C_{12}$-arylene group, an oxyalkene group of formula —O—$R^2$—, an ester group of formula —C(O)—O—$R^2$— or an amide group of formula —C(O)—N($R^3$)$R^2$—, E represents a hydrocarbon group having 1 to 50 C-atoms, $R^2$ represents a $C_2$- to $C_{10}$-alkene group, $R^3$ represents hydrogen or a $C_1$- to $C_{10}$-alkyl group, which can carry substituents, k represents a number between 1 and 1000, n represents a number from 0 to 4999, m represents a number from 1 to 5000, and n+m represents a number between 10 to 5000, under the proviso that a) the molar portion of the structural units (I); on the polymer is between 0 and 99.9 mol-%, and b) the molar portion of the structural units (II) on the polymer is between 0.1 and 100 mol-% of the repetitive units. The invention also relates to a method for the production of said polymers using microwaves.

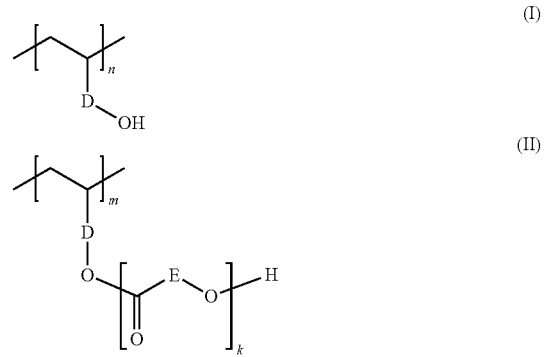

13 Claims, No Drawings

(56) References Cited

U.S. PATENT DOCUMENTS

| | | |
|---|---|---|
| 3,113,026 A | 12/1963 | Sprung |
| 3,197,473 A | 7/1965 | Klosa |
| 3,395,162 A | 7/1968 | Lamberti |
| 3,585,224 A | 6/1971 | Friedrich, at al, |
| 3,652,434 A | 3/1972 | Bar-Nun et al. |
| 3,652,671 A | 3/1972 | Barron |
| 3,682,946 A | 8/1972 | Liechti |
| 3,836,551 A | 9/1974 | Schroeder et al. |
| 4,133,833 A | 1/1979 | Hull |
| 4,165,311 A | 8/1979 | Isowa et al. |
| 4,221,948 A | 9/1980 | Jean |
| 4,339,648 A | 7/1982 | Jean |
| 4,582,933 A | 4/1986 | Mertens et al. |
| 4,675,319 A | 6/1987 | Nardi et al. |
| 4,859,796 A | 8/1989 | Hurtel et al. |
| 4,994,541 A | 2/1991 | Dell et al. |
| 5,114,684 A | 5/1992 | Walker |
| 5,185,466 A | 2/1993 | Kozulic et al. |
| 5,304,766 A | 4/1994 | Baudet et al. |
| 5,326,538 A | 7/1994 | Walker |
| 5,387,397 A | 2/1995 | Strauss et al. |
| 5,419,815 A | 5/1995 | Doerpinghaus et al. |
| 5,646,318 A | 7/1997 | Dery et al. |
| 5,646,319 A | 7/1997 | Letton et al. |
| 5,710,295 A | 1/1998 | Woodbury et al. |
| 5,830,953 A | 11/1998 | Nishikawa et al. |
| 5,856,538 A | 1/1999 | Strecker et al. |
| 5,866,531 A | 2/1999 | Assmann et al. |
| 5,892,115 A | 4/1999 | Aizawa et al. |
| 5,988,877 A | 11/1999 | Hochrad et al. |
| 6,017,426 A | 1/2000 | Semeria et al. |
| 6,107,498 A | 8/2000 | Maisonneuve et al. |
| 6,120,741 A | 9/2000 | Jacquault et al. |
| 6,121,471 A | 9/2000 | Scott |
| 6,127,560 A | 10/2000 | Stidham et al. |
| 6,175,037 B1 | 1/2001 | Tweedy |
| 6,291,712 B1 | 9/2001 | Saihata et al. |
| 6,319,187 B1 | 11/2001 | Scott |
| 6,365,885 B1 | 4/2002 | Roy et al. |
| 6,373,040 B2 | 4/2002 | Thomas |
| 6,614,010 B2 | 9/2003 | Fagrell et al. |
| 6,794,510 B2 | 9/2004 | Le Bourdonnec et al. |
| 6,867,400 B2 | 3/2005 | Collins et al. |
| 6,960,627 B2 | 11/2005 | Huth et al. |
| 6,989,351 B2 | 1/2006 | Asami et al. |
| 7,150,836 B2 | 12/2006 | Meikrantz |
| 7,393,920 B2 | 7/2008 | Collins et al. |
| 7,473,739 B2 | 1/2009 | Dairoku et al. |
| 7,759,454 B2 | 7/2010 | Falk et al. |
| 2003/0021793 A1 | 1/2003 | Hilgers |
| 2005/0027120 A1 | 2/2005 | Gojon-Zorilla |
| 2005/0272631 A1 | 12/2005 | Miracle et al. |
| 2005/0274065 A1 | 12/2005 | Portnoff et al. |
| 2005/0283011 A1 | 12/2005 | Hoong et al. |
| 2006/0057482 A1 | 3/2006 | Yuasa |
| 2006/0228088 A1 | 10/2006 | Charlier de Chily et al. |
| 2006/0252884 A1 | 11/2006 | Falk et al. |
| 2006/0291827 A1 | 12/2006 | Suib et al. |
| 2007/0049721 A1 | 3/2007 | Nefzger et al. |
| 2007/0060762 A1 | 3/2007 | Kawashima et al. |
| 2008/0009541 A1 | 1/2008 | Chambers et al. |
| 2008/0202982 A1 | 8/2008 | Tooley |
| 2008/0264934 A1 | 10/2008 | Moreira et al. |
| 2010/0010244 A1 | 1/2010 | Krull et al. |
| 2010/0032284 A1 | 2/2010 | Krull et al. |
| 2010/0076040 A1 | 3/2010 | Krull et al. |
| 2010/0081843 A1 | 4/2010 | Krull et al. |
| 2010/0116642 A1 | 5/2010 | Krull et al. |
| 2010/0173107 A1 | 7/2010 | Hahn et al. |
| 2011/0083956 A1 | 4/2011 | Krull et al. |
| 2011/0083957 A1 | 4/2011 | Krull et al. |
| 2011/0089019 A1 | 4/2011 | Krull et al. |
| 2011/0089020 A1 | 4/2011 | Krull et al. |
| 2011/0089021 A1 | 4/2011 | Krull et al. |
| 2011/0092722 A1 | 4/2011 | Krull et al. |
| 2011/0137081 A1 | 6/2011 | Krull et al. |
| 2012/0088885 A1 | 4/2012 | Krull et al. |
| 2012/0088918 A1 | 4/2012 | Krull et al. |
| 2012/0090983 A1 | 4/2012 | Krull et al. |
| 2012/0095220 A1 | 4/2012 | Krull et al. |
| 2012/0095238 A1 | 4/2012 | Krull et al. |
| 2012/0103790 A1 | 5/2012 | Krull et al. |
| 2012/0178951 A1 | 7/2012 | Krull et al. |
| 2012/0184758 A1 | 7/2012 | Krull et al. |
| 2013/0274368 A1 | 10/2013 | Krull et al. |
| 2013/0289206 A1 | 10/2013 | Krull et al. |
| 2013/0296457 A1 | 11/2013 | Krull et al. |
| 2013/0296458 A1 | 11/2013 | Krull et al. |

FOREIGN PATENT DOCUMENTS

| | | |
|---|---|---|
| CN | 1351954 | 6/2002 |
| CN | 1749279 | 3/2006 |
| CN | 1931980 | 3/2007 |
| DE | 480866 | 8/1929 |
| DE | 1139738 | 11/1962 |
| DE | 2009156 | 7/1970 |
| DE | 2620638 | 11/1977 |
| DE | 3209800 | 9/1983 |
| DE | 224203 | 7/1985 |
| DE | 102005051637 | 5/2007 |
| DE | 102006047619 | 5/2010 |
| DE | 102009001382 | 9/2010 |
| EP | 0134995 | 3/1985 |
| EP | 0207901 | 1/1987 |
| EP | 0226501 | 6/1987 |
| EP | 0383605 | 8/1990 |
| EP | 0437480 | 7/1991 |
| EP | 0722994 | 7/1996 |
| EP | 0377177 | 7/1997 |
| EP | 0884305 | 12/1998 |
| EP | 1256565 | 11/2002 |
| EP | 1291077 | 3/2003 |
| EP | 1435364 | 7/2004 |
| EP | 1491552 | 12/2004 |
| EP | 1712543 | 10/2006 |
| EP | 1775311 | 4/2007 |
| EP | 2079762 | 6/2007 |
| EP | 1849854 | 10/2007 |
| EP | 1884559 | 2/2008 |
| GB | 0385978 | 3/1931 |
| GB | 0414366 | 7/1934 |
| GB | 07191792 | 12/1954 |
| GB | 2094806 | 9/1982 |
| GB | 2095262 | 9/1982 |
| GB | 2361918 | 11/2001 |
| JP | 10330338 | 5/1997 |
| JP | 11508873 | 8/1999 |
| JP | 2003321427 | 11/2003 |
| JP | 2005322582 | 5/2004 |
| JP | 2006181533 | 12/2004 |
| JP | 2005060256 | 3/2005 |
| JP | 2006272055 | 3/2005 |
| JP | 2008031082 | 2/2008 |
| JP | 2009263497 | 11/2009 |
| WO | WO 90/03840 | 4/1990 |
| WO | WO 94/18243 | 8/1994 |
| WO | WO 95/06518 | 3/1995 |
| WO | WO 95/09821 | 4/1995 |
| WO | WO 96/14344 | 5/1996 |
| WO | WO 98/29461 | 7/1998 |
| WO | WO 98/29467 | 7/1998 |
| WO | WO 98/39370 | 9/1998 |
| WO | WO 03/014272 | 2/2003 |
| WO | WO 03/016359 | 2/2003 |
| WO | WO 03/041856 | 5/2003 |
| WO | WO 03/090669 | 11/2003 |
| WO | WO 2004/054707 | 7/2004 |
| WO | WO 2004/072031 | 8/2004 |
| WO | WO 2005/033062 | 4/2005 |
| WO | WO 2005/118526 | 12/2005 |
| WO | WO 2006/024167 | 3/2006 |
| WO | WO 2007/065681 | 6/2007 |
| WO | WO 2007/110384 | 10/2007 |

(56) References Cited

FOREIGN PATENT DOCUMENTS

| WO | WO 2007/126166 | 11/2007 |
|---|---|---|
| WO | WO 2008/043492 | 4/2008 |
| WO | WO 2008/043493 | 4/2008 |
| WO | WO 2008/043494 | 4/2008 |
| WO | WO 2008/043495 | 4/2008 |
| WO | WO 2009/002880 | 12/2008 |
| WO | WO 2009/064501 | 5/2009 |
| WO | WO 2009/121490 | 10/2009 |

OTHER PUBLICATIONS

Translation of International Preliminary Report on Patentability for PCT1EP2007/008681, Jan. 29, 2008.
International Search Report for PCT/EP2007/008680 Mail dated Feb. 15, 2008.
Translation of International Preliminary Report on Patentability for PCT/EP2007/008680, Feb. 15, 2008.
International Search Report for PCT/EP2007/008579 Mail dated Feb. 4, 2008.
International Search Report for PCT/EP2007/008678 Mail dated Mar. 10, 2008.
Translation of International Preliminary Report on Patentability for PCT/EP2007/008678, Mar. 10, 2008.
International Search Report for PCT/EP2007/008677 Mail dated Mar. 3, 2008.
Translation of International Preliminary Report on Patentability for PCT/EP2007/008677, Mar. 3, 2008.
International Search Report for PCT/EP2009/001989 mail dated Jun. 10, 2009.
Translation of International Preliminary Report on Patentability for PCT/EP2009/001989, dated Oct. 14, 2010.
International Search Report for PCT/EP2009/001985 mail dated Jun. 10, 2009.
Translation of International Preliminary Report on Patentability for PCT/EP2009/001985, dated Oct. 14, 2010.
International Search Report for PCT/EP2009/001986 mail dated Jun. 18, 2009.
Translation of International Preliminary Report on Patentability for PCT/EP2009/001986, dated Oct. 14, 2010.
International Search Report for PCT/EP2009/001987 mail dated Jun. 10, 2009.
Translation of international Preliminary Report on Patentability for PCT/EP2009/001987, dated Oct. 14, 2010.
International Search Report for PCT/EP2009/001984 mail dated Jun. 10, 2009.
Translation of International Preliminary Report on Patentability for PCT/EP2009/001984, dated Oct. 10, 2010.
International Search Report for PCT/EP2009/001990 mail dated Jun. 10, 2009.
Translation of International Preliminary Report on Patentability for PCT/EP2009/001990, dated Dec. 9, 2010.
International Search Report for PCT/EP2009/001988 mail dated Jul. 9, 2009.
Translation of International Preliminary Report on Patentability for PCT/EP2009/001988, dated Jan. 27, 2011.
International Search Report for PCT/EP2010/003446 mail dated Feb. 9, 2011.
Translation of International Preliminary Report on Patentability for PCT/EP2010/003446, dated Jan. 19, 2012.
International Search Report for PCT/EP2010/003447 mail dated Feb. 9, 2011.
Translation of international Preliminary Report on Patentability for PCT/EP2010/003447, dated Feb. 9, 2012.
Written Opinion of the IPEA for PCT/EP2010/003447, dated Sep. 9, 2011.
International Search Report for PCT/EP2010/003444 mail dated Feb. 9, 2011.
Translation of International Preliminary Report on Patentability for PCT/EP2010/003444, dated Jan. 19, 2012.
Response to the Written Opinion in PCT/EP2010/003444, dated Sep. 9, 2011.
International Search Report for PCT/EP2010/003445 mail dated Sep. 1, 2010.
Translation of International Preliminary Report on Patentability for PCT/EP2010/003445, dated Jan. 5, 2012.
International Search Report for PCT/EP2010/003442 mail dated Jul. 20, 2010.
Translation of International Preliminary Report on Patentability for PCT/EP2010/003442, dated Feb. 16, 2012.
International Search Report for PCT/EP2010/003443 mail dated Feb. 9, 2011.
Translation of International Preliminary Report on Patentability for PCT/EP2010/003443, dated Feb. 16, 2012.
International Search Report for PCT/EP2010/005427 dated Mar. 21, 2011.
Translation of International Preliminary Report on Patentability for PCT/EP2010/005427, dated Mar. 21, 2011.
International Search Report for PCT/EP2010/005428 dated Jan. 27, 2011.
Translation of International Preliminary Report on Patentability for PCT/EP2010/005428, dated Jan. 27, 2011.
International Search Report for PCT/EP2011/006173 mail dated May 8, 2012.
Translation of International Preliminary Report on Patentability for PCT/EP2011/006173, dated Jul. 4, 2013.
International Search Report for PCT/EP2011/006172 mail dated Jul. 10, 2012.
Translation of International Preliminary Report on Patentability for PCT/EP2011/006172, dated Jul. 4, 2013.
International Search Report for PCT/EP2011/006175 mail dated May 9, 2012.
Translation of International Preliminary Report on Patentability for PCT/EP2011/006175, dated Jul. 4, 2013.
International Search Report for PCT/EP2011/006174 mail dated Jul. 10, 2012.
Translation of International Preliminary Report on Patentability for PCT/EP2011/006174, dated Jul. 4, 2013.
International Search Report for PCT/EP2011/006176 mail dated Aug. 1, 2012.
Translation of International Preliminary Report on Patentability for PCT/EP2011/006176, dated Jul. 4, 2013.
"Microwave Synthesis" by B. L. Hayes, CEM Publishing 2002.
"Microwave vs. Conventional Heating", webpage, www.biotage.com, Jan. 2009.
Amore et al, (Macromolecular Rapid Communications, vol. 28 (2007), Issue 4, pp. 473-477).
An et al. (J. Org. Chem. (1997), 62, 2505-2511).
B. Toukoniitty, et al: "Esterification of propionic and acid under microwave irradiation over an ion-exchange resin", Catalysis Today, Elsevier, NL, vol. 100, No. 3-4, Feb. 28, 2005, pp. 431-435, XP004850051.
Beilstein Substance Identification, BRN No. 6190607, 1981.
C. Ferroud, et al: "Microwaves-assisted solvent-free synthesis of N-acetamides by amidation or aminolysis", Tetrahedron Letters., vol. 49, Mar. 6, 2008, pp. 3004-3008, XP022602751 NL Elsevier, Amsterdam.
C. Chen et al., J. Chem. Soc., Chem. Commun., 1990, 807-809.
Chemat, et al: "The role of selective heating in the microwave activation of heterogeneous catalysis reactions using a continuous microwave reactor", Journal of Microwave Power and Electromagnetic Energy, The Institute, Vienna, VA, US, vol. 33, No. 2, Jan. 1, 1998. pp. 88-94, XP009143773.
D. Bogdal, Microwave-assisted Organic Synthesis, Elsevier 2005.
Energieeintrag im Discover, "Flexibilitaet ist Trumpf", http://www.cem.de/documents/produlde/mikro_synthese/allgemeines/flexibel.htm, Jun. 2009.
English Abstract for DD 224203, Jul. 3, 1985.
English Abstract for EP 1291077, Mar. 12, 2003.
English Abstract for JP 52125142, Oct. 20, 1977.
English Abstract for JP 54005931, Jan. 17, 1979.

(56) References Cited

OTHER PUBLICATIONS

Erik Esveld, et al: "Pilot Scale Continuous Microwave Dry-Media Reactor. Part 1: Design and Modeling", Chemical Engineering and Technology, Weinheim, DE, vol. 23, No. 3, Jan. 1, 2000, pp. 279-283, XP007916923.
Erik Esveld, et al: "Pilot Scale Continuous Microwave Dry-Media Reactor Part II: Application to Waxy Esters Production", Chemical Engineering and Technology, Weinheim, DE, vol. 23, No. 5, Jan. 1, 2000, pp. 429-435, XP007916803.
G. Pipus, et al: "Esterification of benzoic acid in microwave tubular flow reactor", Chemical Engineering Journal, Elsevier Sequoia, Lausanne, CH, vol. 76, Jan. 1, 2000, pp. 239-245, XP007916929.
Gelens et al., Tetrahedron Letters 2005, 46(21), 3751-3754.
Glasnov, et al: "Microwave-assisted synthesis under continuous-flow conditions", Macromolecular Rapid Communications, 28(4), 395-410 Coden: MRCOE3; Jan. 1, 2007, XP002529633.
Goretzki et al., Macromol. Rapid Commun. 2004, 25, 513-516.
H.J. Bauer, et al., Makromol. Chem., 183, 1982, pp. 2971-2976.
Iannelli et al., Tetrahedron 2005, 61, 1509-1515.
J. Kremsner, et al, Top Curr Chem, (2006) 266: pp. 233-278.
J. Ruhoff, et al., J. Am. Chem. Soc. 59 (1937), 401-402.
K. Lange, K.H. Löcherer, Taschenbuch der Hochfrequenztechnik [Pocket book of high-frequency technology], vol. 2, p. K21 ff.
Katritzky et al. (Energy & Fuels 4 (1990), 555-561).
Konrad G. Kabza, et al: "Microwave-induced Esterification Using Heterogeneous Acid Catalyst in a Low Dielectric Constant Medium", Journal of Organic Chemistry, American Chemical Society, Easton.; US, vol. 65, Jan. 1, 2000, pp. 1210-1214, XP007916930.
Kumar, et al., "Microwave Assisted Direct Synthesis of 2-Substituted Benzoxazoles From Carboxylic Acids Under Catalyst and Solvent-Free Conditions", SYNLETT, No. 9, 2005, pp. 1401-1404.
L. Perreux. et al: "Microwave effects in solvent-free esters aminolysis" Tetrahedron, Elsevier Science Publishers, Amsterdam, NL, vol. 59, No. 12, Mar. 17, 2003, pp. 2185-2189, XP004414169.
L. Perreux, et al: "Solvent-free preparation of amides from acids and primary amines under microwave irradiation", Tetrahedron, Elsevier Science Publishers, Amsterdam, NL, vol. 58, No. 11, Mar. 11, 2002, pp. 2155-2162, XP004343866.
M. S. Nery, et al "Niobium pentachloride promoted conversion of carboxylic acids to carboxamides: Synthesis of the 4-aryl-1,2,3,4-tetrahydroIsoquinollne alkaloid structures" Synthesis, (2),272-276, 2003.
Massicot et al., Synthesis 2001 (16), 2441-2444.
Noel S. Wilson, et al: "Development and Applications of a Practical Continuous Flow Microwave Cell", Organic Process Research and Development, American Chemical Society, US, vol. 8, No. 3, Jan. 1, 2004, pp. 535-538, XP007916928.
Pipus et al. (First European Congress on Chemical Engineering, Firenze, Italy, May 4-7, 1997; AIDIC: Milan, Italy, 1997; pp. 45-48).
O. Yang et al. (Synth. Commun. 2008, 38, 4107-4115).
R. Jachuck, et al: "Process intensification: oxidation of benzyl alcohol using a continuous isothermal reactor under microwave irradiation", Green Chemistry, Royal Society of Chemistry, GB, vol. 8, Jan. 1, 2006, pp. 29-33, XP007916789.
R. Martinez-Paiou, et al., "Synthesis of Long Chain 2-Alkyl-1-(2-hydroxyethyl)-2-imidazolines Under Microwave in Solvent-Free Conditions", Synlett 2003, No. 12, pp. 1847-1849.
R. Plantier-Royon et al., "Synthesis of Functionalized Bis-Amides of L-(+)-Tartaric Acid and Application as Copper(ll) Ligands", C.R. Chimie, 2004, pp. 119-123.
R. S. Varma, et al: "Solvent-free synthesis of amides from non-enolizable esters and amines using microwave irradiation" Tetrahedron Letters, Elsevier, Amsterdam, NL, vol. 40, No. 34, Aug. 20, 1999, pp. 6177-6180, XP004174006.
R.S. Hunter, "Conversion of Visual to Instrumental Measurements of Yellowness", 1981, JAOCS, May, pp. 606-612.
S. Schmitz, et al., "Access to Poly{N-[3-(dimethylamino)propyl](meth)acrylamide} via Microwave-Assisted Synthesis and Control of LCST-Behavior in Water", Macromolecular Rapid Communications, vol. 28, No. 21, Nov. 1, 2007, pp. 2080-2083.
Synthewave 402 Manual, 2000, Prolabo, Support pp. 2 and Manual pp. 1-13 (total 15 pages).
T. Cablewski, et al: "Development and Application of a Continuous Microwave Reactor for Organic Synthesis" Journal of Organic Chemistry, American Chemical Society, Easton.; US, vol. 59, Jan. 1, 1994, pp. 3408-3412, XP000198783.
Vazquez-Tato, M.P., "Microwave-Mediated Synthesis of Amides", SYNLETT, No. 7, 1993, p. 506.
X. Wu, et al., "Microwave Enhanced Aminocarbonylations in Water", Organic Letters, 7(15). pp. 3327-3329, 2005.
Zradni et al. (Synth. Commun. 2002, 32, 3525-3531).
"Objective Colour Assesment and Quality Control in the Chemical, Pharmaceutical and Cosmetic Industries", Application Report No. 3.9 e from Hach Lange, pp. 1-28, Feb. 2013.
(Hawley's Condensed Chemical Dictionary, 14th ed., Lewis, Richard J. Sr. ed., copyright 2002 John Wiley & Sons, Inc., avaliable online at http://www.knovel.comlwebiportalibrowseidisplay? EXT Knovel Display bookid=704&VerticalID=0).
A. Breccia et al, "Reaction Between Methanol and Commerical Seed Oils Under Microwave Irradiation" Internation Microwave Power Institute 1999, 34, pp. 3-8
Advanced Organic Chemistry: Reactions, Mechanisms, and Structure; Second Edition, Jerry March, Wiley-Intersceince Publication, pp. 324-331 and 328-389, 1977.
Wolf, et al., AOSTRA Journal of Research 3 (1986) "Microwave Assisted Catalytic Conversion of Cyclohexene" pp. 53-59.
Arfan et al, "Efficient Combination of Recyclable Task Specific Ionic Liquid and Microwave Dielectric Heating for the Synthesis of Lipophilic Esters," Organic Research & Development vol. 9, pp. 743-748 (2005).
Arora et al, "A mild and efficient procedure for the conversion of aromatic carboxylic acid esters to secondary amides" Can. J. Chem. vol. 83 (2005), pp. 1137-1140.
Barbosa et al, "Niobium to alcohol mol ratio control of the concurring esterification and etherification reactions promoted by NbCl5 and A12O3 catalysts under microwave irradiation." App. Catalysis A: General vol. 338, pp. 9-13 (2008).
Bose et al, "Microwave promoted energy-efficient N-formylation with aqueous formic acid," Tetrahedron Let. vol. 47 (2006), pp. 4605-4607.
C. Mazzocchia et al., "Fatty acid methyl esters synthesis from triglycerides over heterogeneous catalysts in the presence of microwaves" C.R. Chimie 7 (2004) pp. 601-605.
Desai et al, "Thermal and microwave-assisted N-formylation using solid-supported reagents," Tetrahedron Let. vol. 46 (2005), pp. 955-957.
DiLuca et al, "A new, simple procedure for the synthesis of formyl amides," Synlett No. 14 (2004), pp. 2570-257.
Ella Bezdushna et al, Macromolecular Chemistry & Physics, vol. 209, pp. 1942-1947, XP55023715, 2008.
Ella Bezdushna et al; "Microwave-Assisted Esterification of Methacrylic Acid and Polymer-Analogous Esterification of Poly[ethylene-co-(acrylic acid)] with Dissimilar Phenols", Macromolecular Rapid Communcations. vol. 208, No. 4, Feb. 19, 2007, pp. 443-448, XP55023715.
English Abstract for CH 681586, Apr. 15, 1993.
English Abstract for CN 1749279, Mar. 2006.
English Abstract for CN 1931980, Mar. 2007.
English Abstract for DE 102005051637, May 3, 2007.
English Abstract for DE 102009001382, Sep. 9, 2010.
English Abstract for DE 2620638, Nov. 24, 1977.
English Abstract for DE 480866, Aug. 1929.
English Abstract for EP 0134995, Mar. 27, 1985.
English Abstract for EP 1256565, Nov. 13, 2002.
English Abstract for JP 10330338, May 1997.
English Abstract for JP 2003321427, Nov. 11, 2003.
English Abstract for JP 2005060256, Mar. 10, 2005.
English Abstract for JP 2005322582, May 2005.
English Abstract for JP 2006181533, Dec. 2004.
English Abstract for JP 2006272055, Mar. 2005.

(56) References Cited

OTHER PUBLICATIONS

English Abstract for JP 2008031082, Feb. 14, 2008.
English Abstract for WO 03/090669, Nov. 6, 2003.
English Translation of CN 1351954, Jun. 5, 2002.
English translation of DIN Standard 6162, Mar. 2013.
English translation of JP 2009 263 497, 2009.
Essen et al, "The Velocity of Propagation of Electromagnetic Waves Derived from the Resonant Frequencies of a cylindrical Cavity Resonator," Proc. R. Soc. Lond. A (1948), vol. 194, pp. 348-361.
Fats and Oils: Formulating and Processing for Applications, Second Ed., O'Brien, CRC Press Ch. 3, sec. 3.4.2., lines 12-13.
Fatty Acids Division, Soap Association, "Fatty Acids for Chemical Specialties: A symposium of the Soap, Detergents, and Sanitary Chemical Products Division of the Chemical Specialties Manufacturers Association," 1955, pp. 131-147, avaliable online at http://www.aciscience.org/Oleochemical/FattyAcid.aspx.
Gonzalez et al, "Tartradiamide formation by thermolysis of tartaric acid with alkylamines," Tetrahedron Letters vol. 29 (2008 3925-3926.
Ishihara et al, "3,4,5-Trifluorobenzeneboronic Acid as an Extremely Active Amidation Catalyst," J. Org. Chem. vol. 61, (1996), pp. 4196-4197.
Jain et al, "Acetylation of some organic compounds under microwave irradiation," J. Indian Chem. Soc., vol. 84, Feb. 2007, p. 188.
Kangani, et al., "One Pot direct synthesis of amides or oxazolines from carboxylic acids using Deoxo-Fluor reagent," Tetrahedron Letters, vol. 46, (2005), pp. 8917-8920.
Karl G. Kempf et al: "A Procedure for Preparing Aryl Esters of Polyacids. The Conversion of Poly(methacrylic acid) to Poly(phenyl methacrylate)", Macromolecules, vol. 11, No. 5, Sep. 1, 1978, pp. 1038-1041, XP55024162.
Katritzky et al, "Efficient microwave access to polysubstituted amidines from imidoylbenzotriazoles," J. Org. Chem. vol. 71, pp. 3375-3380 (2006).
KIC Chemicals Inc., Capric Acid, available online at http://www.kicgroup.com/capric.htm.
Leadbeater, et al, Continuous-Flow Preparation of Biodiesel Using Microwave Heating:, Energy & Fuels 2007, 21, pp. 1717-1781.
M. Hajek In A. Loupe "Microwaves in Organic Synthesis", Wiley, 2006, Chapter 13. pp. 615-652.
Machetti, et al., "Parallel Synthesis of an Amide Library Based on the 6,8-Dioxa-3-azabicyclo[3.2 1.]octane Scaffold by Direct Aminolysis of Methyl Esters," J. Comb. Chem., 2007, vol. 9, pp. 454-461.
Mazzocchia, C., et al., Fast synthesis of biodiesel from trigycerides in presence of microwave, 2006. Advances in Microwave and Radio Frequency Processing, Report of the 8th international conference on microwave and high frequency heatting held in Bayrueth, Germany, Sep. 2001, Springer Berlin Heidelberg, Part V, pp. 370-376 (18 pages).
Mohan et al, "Zeolite catalyzed acylation of alcohols and amines with acetic acid under microwave irradiation," Green Chem. 2006, vol. 8, pp. 368-372.
N. Azcan et al, "Alkali catalyzed transesterification of cottonseed oil by microwave irradiationg" Fuel 86 (2007) pp. 2639-2644, XP022322088.
N. Azcan et al, "Microwave assisted transesterification of rapseed oil" Fuel 87 (2008) pp. 1781-1788, XP022611169.
N. Leadbeater et al, "Fast, Easy Preparation of Biodiesel Using Microwave Heating" Energy & Fuels 2006, 20, pp. 2281-2283.
N. Saifuddin et al, "Production of Ethyl Ester (Biodiesel) from used Frying Oil: Optimization of Transesterification Process using Microwave Irradiation" Malaysian Journal of Chemistry. 2004, vol. 6, pp. 77-82.
Oliver Kretschmann et al: Microwave-Assisted Synthesis of Associative Hydrogels., Macromolecular Rapid Communications, vol. 28, No. 11, Jun. 1, 2007, pp. 1265-1269, XP55023774.
Petricci et al, "Microwave-assisted acylation of amines, alcohols, and phenols by the use of solid-supported reagents (SSRs)," J. Org. Chem. vol. 69, pp. 7880-7887, (2004).
Pollington, Journal of Organic Chemistry, vol. 56, pp. 1313-1314, 1991.
Reddy et al, "Zirconyl chloride promoted highly efficient solid phase synthesis of amide derivatives," Chinese Chemical Letters, vol. 18 (2007), pp. 1213-1217.
Sebastian Sinnwell et al: "Microwave assisted hydroxyalkylamidation of poly(ethylene-co-acrylic acid) and formation of grafted poly([epsilon]-caprolactone) side chains", J. of Polymer Science Part A: Polymer Chemistry, vol. 45, No. 16, Aug. 15, 2007, pp. 3659-3667.
Shore, et al, "Catalysis in Capillaries by Pd Thin Films Using Microwave-Assisted Continuous-Flow Organic Synthesis (MACOS)" Angewandte Chemie 2006, 118, pp. 2827-2832.
Translation of SIPO Office Action for Application 200980101830.0, May 12, 2012.
Translation of SIPO Search Report for Application 200980101830.0, May 12, 2012.
V. Lertsathapornsuk et al, "Microwave assisted in continous biodiesel production from waste frying palm oil and its performance in a 100 kW diesel generator" Fuel Processing Technology 89 (2008) pp. 1330-1336, XP025581095.
Vacek et al, "Selective enzymic esterification of free fatty acids with n-butanol under microwave irradiation and under classical heating," Biotechnology Letters, vol. 22, pp. 1565-1570 (2000).
Werner et al, "Design and synthesis of a 3,4-dehydroproline amide discovery library," J. Comb. Chem. (2007), 9(4), pp. 677-683.
Zhaoju Yu et al: "Biodegradable polyvinyl alcohol)-graftpoly(epslton-caprolactone) comb-like polyester: Microwave synthesis and its characterization", Journal of Applied Polymer Science, vol. 104, No. 6, Jun. 15, 2007, pp. 3973-3979, XP55023617.
Zradni, et al, "Minutes Synthesis of Amides from Esters and Amines Under Microwave Irradiation," Fifth International Electronic Conference on Synthetic Organic Chemistry (ECSOC-5), available at http://www.mdpi.org/ecsoc/ecsoc-5/Papers/e0013/e0013.html.

POLYMERS CARRYING HYDROXYL GROUPS AND ESTER GROUPS AND METHOD FOR THE PRODUCTION THEREOF

The present invention relates to polymers bearing hydroxyl groups and ester groups, and to a process for preparation thereof by polymer-analogous esterification of aqueous solutions of hydroxyl-bearing addition polymers in a microwave field.

Higher molecular weight synthetic polymers bearing a multitude of hydroxyl groups, for example poly(vinyl alcohol), are nonionic water-soluble thermoplastic polymers which are converted to highly viscous materials above their melting point. The water solubility of the polymers depends on factors including the concentration of hydroxyl groups in the polymer and, in the specific case of poly(vinyl alcohol), is also a function of the degree of hydrolysis of the poly(vinyl acetate) used for preparation thereof. For example, poly(vinyl alcohol) with a high hydrolysis level is highly crystalline and is soluble only in hot water. Poly(vinyl alcohol) has interesting physicochemical properties such as layer and film formation, emulsification characteristics and adhesion, which mean that it is of interest for a multitude of industrial applications. In addition, it has a high tensile strength, but this gives way to increasing elasticity with rising moisture content, for example in the event of rising air humidity, which is manifested, for example, in greater extensibility of films.

Chemical modification can influence the properties of hydroxyl-bearing polymers within wide limits. For example, hydrophobic modification can improve the resistance thereof to chemicals and solvents, and also the thermal stability thereof. On the other hand, for example in the case of poly(vinyl alcohol), tensile strength is preserved after hydrophobic modification, even in the event of high air humidity, without loss of water solubility. For various applications, for example for temporary surface coatings, polyvinyl alcohols having increased tensile strength and with better solubility, especially in cold water, would be advantageous, since they would better protect the surfaces from mechanical damage, but would then be easy to remove with cold water. On the other hand, the solution viscosity of the polymers should not increase significantly in the process, in order to be able to undertake the application with available techniques. The standard methods for derivatization of polyvinyl alcohol, for example acetalization with aldehydes, cannot be used to establish the desired profile of properties.

What would be desirable would be the modification of water-soluble, hydroxyl-bearing and hence nonionic polymers with side chains again containing hydroxyl groups, these side chains lowering the crystallinity of the base polymer via steric effects without critically reducing the water solubility thereof. One example of a method suitable for this purpose would be esterification with hydroxycarboxylic acids. In the case of esterification, the low solubility of hydroxyl-bearing polymers in organic solvents presents considerable preparative difficulties in the conversion and especially in the preparation of homogeneous products. For polymer-analogous reactions, the polymer to be reacted has to be converted to a soluble or at least swollen form, in order to ensure a homogeneous reaction. If the polymer is insoluble in the reaction medium, only surface reactions are possible; if the polymer is swollen in the reaction medium, the reaction rate depends on the accessibility of the functional groups in the pores of the polymer matrix. In partially crystalline polymers, moreover, reactions take place virtually only in the amorphous regions, since diffusion processes in the crystalline region are very slow.

Hydroxyl-bearing polymers, for example polyvinyl alcohol, in solvent-free form are solids or highly viscous materials which have to be fluidized either thermally or by means of solvent for homogeneous chemical reactions. A preferred solvent for most hydroxyl-bearing polymers is water. However, water is not usually very suitable as a solvent for condensation reactions, since it shifts the reaction equilibrium in favor of the reactants. It is usually also possible to dissolve such polymers as poly(vinyl alcohol), for example, in polar aprotic solvents, for example dimethyl sulfoxide, formamide, dimethylformamide and hexamethylphosphoramide. In the course of removal of these high-boiling solvents on completion of conversion, the polymer usually suffers thermal damage, which in many cases makes it unusable for a further use.

There are likewise limits to the preparation of corresponding (co)polymers by (co)polymerization of, for example, vinyl acetate with hydroxyl-bearing monomers, since suitable monomers, for example hydroxyalkyl vinyl esters or hydroxyalkyl acrylates, are available industrially only to a limited degree and are very expensive in most cases. In addition, the hydrolysis of the acyl groups to hydroxyl groups, which is required subsequently, also at least partially hydrolyzes the ester groups of the comonomers.

According to the prior art, polymer-analogous esterification of hydroxyl-bearing polymers with hydrophobic long-chain carboxylic acids with reactive acid derivatives, for example acid anhydrides or acid chlorides, is possible. However, this gives rise to at least equimolar amounts of carboxylic acids or salts which have to be removed and disposed of or worked up, and cause high costs. Since hydroxyl-bearing polymers, for example poly(vinyl alcohol), are essentially soluble only in water, reaction of the reactive acid derivative with water forms further unwanted by-products. Corresponding reactive acid derivatives of hydroxyl-bearing carboxylic acids, for example acid chlorides or anhydrides of hydroxycarboxylic acids, are chemically unstable, and so such polymer-analogous modifications are not available.

Esterification of hydroxyl-bearing polymers with free carboxylic acids by a direct route is additionally problematic owing to the different viscosities of polymers and acids, and the insolubility of the polymers in organic solvents on the other hand. According to U.S. Pat. No. 2,601,561, it is possible to esterify poly(vinyl alcohol) with, based on the hydroxyl groups, at least equimolar amounts of ethylenically unsaturated carboxylic acids having at least 14 carbon atoms in solvents such as phenol, cresol or xylenol. This esterification requires temperatures between 150 and 250° C. and takes 2 to 5 hours. The products obtained have an intense brown color and contain firstly high molecular weight crosslinked components and secondly low molecular weight degradation products. Even after workup, they still contain residual amounts of the nonvolatile solvents, which are of toxicological concern.

A more recent approach to chemical synthesis is that of reactions in a microwave field. A distinct acceleration of the reactions is often observed, which means that these processes are of great interest both for economic and for environmental reasons. For instance, the prior art discloses various esterifications of carbohydrates, which, almost without exception, have been conducted with fatty acid esters having a higher reactivity than the free fatty acids and nevertheless lead only to very low degrees of acylation. CN-1749279 teaches that, in the course of reaction of carbohydrates with acids at elevated temperature, there is simultaneous degradation of the polymer, and this, depending on the raw material used and the reaction conditions chosen, leads to products with highly variable properties.

Chem. Eng. 2010, January, 16 discloses the preparation of poly(lactic acid) under microwave irradiation of aqueous lactic acid solutions. However, poly(lactic acid) is a water-insoluble thermoplastic which does not exhibit the profile of properties sought.

The problem addressed was consequently that of providing a method for polymer-analogous modification of hydroxyl-bearing main chain polymers with hydroxyalkyl side chains, this method allowing modification of the properties of such nonionic water-soluble polymers in volumes of industrial interest and in a simple an inexpensive manner. Of particular interest is the esterification of secondary hydroxyl-bearing linear addition polymers and especially of secondary hydroxyl-bearing linear addition polymers with a backbone formed exclusively from C—C bonds. More particularly, the tensile strength of the polymers is to be increased, with simultaneous improvement in the solubility thereof, especially in cold water. In addition, the solution viscosity of the polymers is not to differ significantly from the viscosity of the parent polymers, in order to be able to employ them on existing machinery with known technology. To achieve constant product properties both within a reaction batch and between different reaction batches, the modification is to be very substantially homogeneous, meaning a random distribution over the entire polymer. Furthermore, no reactions in the polymer backbone, such as polymer degradation in particular, are to take place, and no significant amounts of by-products of toxicological and/or environmental concern are to arise.

It has been found that, surprisingly, high molecular weight, hydroxyl-bearing polymers can be esterified in aqueous solution and/or in solutions composed of water and water-miscible organic solvents with hydroxycarboxylic acids under the influence of microwaves at temperatures above 100° C. In this way, the tensile strength of hydroxyl-bearing polymers can be distinctly increased, with simultaneous improvement in the solubility in cold water. The solubility of polymers modified in such a way gives no pointers to the presence of any larger hydrophilic or hydrophobic polymer blocks. Since a multitude of different hydroxycarboxylic acids is available inexpensively and in industrial volumes, the properties of said polymers can be modified within wide limits in this way. There is no degradation of the polymer chains.

The invention accordingly provides esters of hydroxyl-bearing polymers containing repeat structural units of the formulae (I) and (II) in block, alternating or random sequence

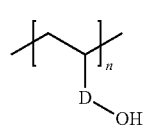

(I)

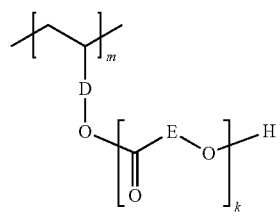

(II)

in which
D is a direct bond between polymer backbone and hydroxyl group, a $C_1$- to $C_6$-alkylene group, a $C_5$- to $C_{12}$-arylene group, an oxyalkylene group of the formula —O—$R^2$—, an ester group of the formula —C(O)—O—$R^2$— or an amide group of the formula —C(O)—N($R^3$)$R^2$—
E is a hydrocarbyl radical having 1 to 50 carbon atoms,
$R^2$ is a $C_2$- to $C_{10}$-alkylene radical,
$R^3$ is hydrogen or a $C_1$- to $C_{10}$-alkyl radical which may bear substituents,
k is a number between 1 and 1000,
n is a number from 0 to 4999,
m is a number from 1 to 5000,
n+m is a number from 10 to 5000, with the proviso that
a) the molar proportion of the structural units (I) in the polymer is between 0 and 99.9 mol %, and
b) the molar proportion of the structural units (II) in the polymer is between 0.1 and 100 mol % of the repeat units.

The invention further provides a process for preparing esters of hydroxyl-bearing polymers containing repeat structural units of the formulae (I) and (II) in block, alternating or random sequence

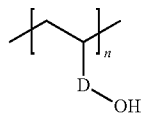

(I)

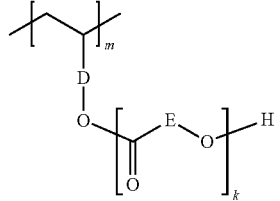

(II)

in which
D is a direct bond between polymer backbone and hydroxyl group, a $C_1$- to $C_6$-alkylene group, a $C_5$- to $C_{12}$-arylene group, an oxyalkylene group of the formula —O—$R^2$—, an ester group of the formula —C(O)—O—$R^2$— or an amide group of the formula —C(O)—N($R^3$)$R^2$—,
E is a hydrocarbyl radical having 1 to 50 carbon atoms,
$R^2$ is a $C_2$- to $C_{10}$-alkylene radical,
$R^3$ is hydrogen or a $C_1$- to $C_{10}$-alkyl radical which may bear substituents,
k is a number between 1 and 1000,
n is a number from 0 to 4999,
m is a number from 1 to 5000,
n+m is a number from 10 to 5000, with the proviso that
a) the molar proportion of the structural units (I) in the polymer is between 0 and 99.9 mol %, and
b) the molar proportion of the structural units (II) in the polymer is between 0.1 and 100 mol % of the repeat units,
by irradiating hydroxyl-bearing polymers A) containing the repeat structural unit of the formula (I) together with hydroxycarboxylic acids B1) of the formula (III) or hydroxycarboxylic esters B2) of the formula (IV)

HO-E-COOH      (III)

HO-E-COOR$^5$      (IV)

in which $R^5$ is a $C_1$-$C_4$-alkyl radical with microwaves in the presence of water, wherein the reaction mixture is heated by the microwave irradiation to temperatures above 100° C.

The invention further provides esters of hydroxyl-bearing polymers containing repeat structural units of the formulae (I) and (II) in block, alternating or random sequence, prepared by reaction of hydroxyl-bearing polymers A) having repeat structural units of the formula (I), in the presence of hydroxycarboxylic acids of the formula (III) or hydroxycarboxylic esters of the formula (IV) and in the presence of water, under irradiation with microwaves, wherein the reaction mixture is heated by the microwave irradiation to temperatures above 100° C.

Preferred hydroxyl-bearing polymers A) are main chain polymers whose polymer backbone is formed exclusively from C—C bonds and which accordingly does not contain any heteroatoms. Preferred hydroxyl-bearing polymers A) can, however, contain groups with heteroatoms at the chain end, and these get into the polymer, for example, through the initiator and/or moderator during the polymerization. Polymer A preferably contains a total of at least 5, more preferably at least 10, especially at least 15 and particularly at least 20 hydroxyl-bearing monomer units, i.e. n is at least 5, 10, 15 or 20. These monomer units, in the case of copolymers, can also be combined with or interrupted by structural units derived from other monomers.

D is preferably a direct bond between polymer backbone and the hydroxyl group in formula I or the oxygen atom in formula II. The structural unit of the formula (I) in this case is derived from vinyl alcohol. In a further preferred embodiment, D is a linear or branched alkylene radical. This preferably has one, two, three or four carbon atoms. Examples of this include structural units derived from allyl alcohol or from 3-buten-1-ol 3-buten-1-ol, 1-penten-3-ol or 4-penten-1-ol. In a further preferred embodiment, D is an oxyalkylene group in which $R^2$ is preferably an alkylene group having two, three or four carbon atoms. Such structural units (I) derive preferably from hydroxyalkyl vinyl ethers, for example hydroxyethyl vinyl ether or hydroxybutyl vinyl ether. In a further preferred embodiment, D is an ester group. Preferably, $R^2$ is an alkylene group having 2 or 3 carbon atoms. Such structural units (I) derive, for example, from hydroxyalkyl esters of acrylic acid and methacrylic acid, for example from hydroxyethyl acrylate, hydroxyethyl methacrylate, hydroxypropyl acrylate and hydroxypropyl methacrylate. In a further preferred embodiment, D is an amide group bonded via an $R^2$ group to the hydroxyl group. Preferably, $R^2$ here is an alkyl group having 2 or 3 carbon atoms. $R^3$ may, if it is an alkyl radical, bear substituents, for example a hydroxyl group. Preferably, $R^3$ is hydrogen, methyl, ethyl or hydroxyethyl. Such structural units (I) derive, for example, from hydroxyalkylamides of acrylic acid and methacrylic acid, for example of hydroxyethylacrylamide, hydroxyethylmethacrylamide, hydroxypropylacrylamide, hydroxypropylmethacrylamide. Polymers containing a plurality of, for example two, three, four or more, different structural units of the formula (I) are also suitable in accordance with the invention. The process according to the invention is especially suitable for the esterification of polymers bearing secondary OH groups.

Particularly preferred structural units of the formula (I) derive from vinyl alcohol.

The process according to the invention is also suitable for modification of copolymers of hydroxyl-bearing monomers which, as well as the hydroxyl-bearing units of the formula (I), have structural elements derived from one or more further monomers not bearing any hydroxyl groups. Preferred further monomers are olefins, esters and amides of acrylic acid and methacrylic acid, vinyl esters, vinyl ethers, vinylamines, allylamines, and derivatives thereof. Examples of preferred comonomers are ethene, propene, styrene, methyl acrylate, methyl methacrylate, and esters of acrylic acid and methacrylic acid with alcohols having 2 to 24 carbon atoms. Preferably, copolymers contain more than 10 mol %, more preferably 15-99.5 mol %, particularly 20-98 mol %, especially 50-95 mol %, for example 70-90 mol %, of structural units (I) which derive from a monomer bearing a hydroxyl group.

Examples of suitable copolymers A) are copolymers of vinyl alcohol with vinyl esters such as, more particularly, copolymers of vinyl alcohol with vinyl acetate as obtainable, for example, by partial hydrolysis of polyvinyl acetate. Preference is given to copolymers which, as well as vinyl alcohol, contain 0.5 to 60 mol % and more preferably 1 to 50 mol %, for example 1.5 to 10 mol %, of vinyl acetate. Proceeding from partly hydrolyzed poly(vinyl acetate), it is thus also possible by the process according to the invention to prepare terpolymers of vinyl acetate, vinyl alcohol, and vinyl alcohol esterified in accordance with the invention with a hydroxycarboxylic acid of the formula (III) and/or a carboxylic ester of the formula (IV). In addition, all or some ester groups present in copolymer A) can be transesterified in the process according to the invention.

Further examples of further suitable copolymers A) are copolymers of vinyl alcohol and ethylene, vinyl alcohol and styrene, and copolymers of hydroxyethyl methacrylate and methyl methacrylate.

Preferred copolymers A) are homogeneously soluble or at least swellable in water or solvent mixtures of water and water-miscible organic solvent at temperatures above 40° C., for example at 50° C., 60° C., 70° C., 80° C. or 90° C. Further preferably, they are homogeneously soluble or swellable in water or solvent mixtures of water and water-miscible organic solvent at a concentration of at least 1% by weight and especially 5 to 90% by weight, for example 20 to 80% by weight, at temperatures above 40° C., for example at 50° C., 60° C., 70° C., 80° C. or 90° C.

Particularly preferred hydroxyl-bearing main chain polymers A) are poly(vinyl alcohols). Poly(vinyl alcohols) are understood in accordance with the invention to mean both homopolymers of vinyl alcohol and copolymers of vinyl alcohol with other monomers. Particularly preferred copolymers are those containing 0.5 to 20 mol %, preferably 1 to 15 mol %, of vinyl esters. These are typically prepared by polymerization or copolymerization of esters of vinyl alcohol with lower carboxylic acids, followed by hydrolysis of the ester. A preferred ester of vinyl alcohol is vinyl acetate. The polymer can be fully or partly hydrolyzed.

Further particularly preferred copolymers are copolymers of ethylene and vinyl alcohol. Especially preferred are those which contain 15-70 mol % and especially 20-60 mol %, for example 25-50 mol %, of structural units derived from ethylene.

The weight-average molecular weight $M_W$ of preferred polymers A), determined on acetylated samples by means of gel permeation chromatography and static light scattering, is preferably between 10 000 and 500 000, especially between 12 000 and 300 000 and particularly between 15 000 and 250 000 g/mol. The molecular weight of the modified polymers is increased according to the degree of esterification thereof and the molecular weight of the acyl radical.

Suitable hydroxycarboxylic acids B1) are generally compounds having at least one carboxyl group and a hydroxyl group. Thus, the process according to the invention is equally suitable for conversion of hydroxycarboxylic acids having, for example, two, three, four or more carboxyl groups. Preferred hydroxycarboxylic acids have one carboxyl group. The process according to the invention is additionally suitable for conversion of hydroxycarboxylic acids having, for example, two, three, four or more hydroxyl groups. Preferred hydroxycarboxylic acids have one hydroxyl group. The hydroxycarboxylic acids may be of natural or synthetic origin. Particular preference is given to those hydroxycarboxylic acids which bear a hydrocarbyl radical E having 2 to 30 carbon atoms and especially having 3 to 20, for example having 4 to 12, carbon atoms. The hydrocarbyl radical is preferably aliphatic, cycloaliphatic, aromatic or araliphatic. The hydrocarbyl radical may bear one or more, for example two, three, four or more, further substituents, for example carboxyl, hydroxyl, hydroxyalkyl, alkoxy, for example methoxy, poly(alkoxy), poly(alkoxy)alkyl, amide, cyano, nitrile, nitro and/or $C_5$-$C_{20}$-aryl groups, for example phenyl groups, with the proviso that the substituents are stable under the reaction conditions and do not enter into any side reactions, for example elimination reactions. The hydrocarbyl radical E may also contain heteroatoms, for example oxygen, nitrogen, phosphorus and/or sulfur, but preferably not more than one heteroatom per 2 carbon atoms.

In a preferred embodiment, the polymers A) are reacted with aliphatic hydroxycarboxylic acids B1), i.e with carboxylic acids bearing at least one hydroxyl group on an aliphatic hydrocarbyl radical E. These aliphatic hydrocarbyl radicals may be linear, branched or cyclic. The carboxyl group may be bonded to a primary, secondary or tertiary carbon atom. The hydrocarbyl radicals may be saturated or unsaturated. They are preferably saturated. Unsaturated hydrocarbyl radicals contain one or more and preferably one, two or three C=C double bonds. Preferably, any double bonds are not conjugated to the carboxyl group. In a particularly preferred embodiment, the aliphatic hydrocarbyl radical is an unsubstituted alkylene or alkenylene radical. In a further particularly preferred embodiment, the aliphatic hydrocarbyl radical bears one or more, for example two, three or more, of the abovementioned substituents.

Preferred cycloaliphatic hydrocarbyl radicals E are aliphatic hydrocarbyl radicals having 2 to 24 and especially having 3 to 20 carbon atoms. They may optionally contain one or more heteroatoms, for example nitrogen, oxygen or sulfur. Particularly preferred cycloaliphatic hydrocarbyl radicals have at least one ring having four, five, six, seven, eight or more ring atoms. The carboxyl group is bonded to one of the rings.

The hydroxyl group may be bonded to a primary, secondary or tertiary carbon atom of the aliphatic hydrocarbyl radical. Particular preference is given to hydroxycarboxylic acids/esters which contain a hydroxyl group bonded to a secondary and especially to a tertiary carbon atom, and to those hydroxycarboxylic acids in which the hydroxyl group is in the α, β or γ position to the carboxyl group. The carboxyl and hydroxyl group may be bonded to the same carbon atom or to different carbon atoms of E. The process according to the invention is equally suitable for esterification of polyhydroxycarboxylic acids having, for example, two, three, four or more hydroxyl groups, although the hydroxycarboxylic acids may bear only one hydroxyl group per carbon atom of the aliphatic hydrocarbyl radical E. Particular preference is given to hydroxycarboxylic acids which bear an aliphatic hydrocarbyl radical $R^3$ having 1 to 30 carbon atoms and especially having 2 to 24 carbon atoms, for example having 3 to 20 carbon atoms.

Suitable aliphatic hydroxycarboxylic acids are, for example, hydroxyacetic acid, 2-hydroxypropionic acid, 3-hydroxypropionic acid, 2-hydroxybutyric acid, 3-hydroxybutyric acid, 4-hydroxybutyric acid, 2-hydroxy-2-methylpropionic acid, 4-hydroxypentanoic acid, 5-hydroxypentanoic acid, 2,2-dimethyl-3-hydroxypropionic acid, 5-hydroxyhexanoic acid, 2-hydroxyoctanoic acid, 2-hydroxytetradecanoic acid, 15-hydroxypentadecanoic acid, 16-hydroxyhexadecanoic acid, 12-hydroxystearic acid and α-hydroxyphenylacetic acid, 4-hydroxymandelic acid, 2-hydroxy-2-phenylpropionic acid and 3-hydroxy-3-phenylpropionic acid. It is also possible to esterify polyhydroxycarboxylic acids, for example gluconic acid, and polyhydroxypolycarboxylic acids, for example tartaric acid and gluconic acid, with the hydroxyl-bearing polymers A) by means of the process according to the invention. Hydroxycarboxylic acids particularly preferred in accordance with the invention are hydroxyacetic acid, 2-hydroxypropionic acid, 2-hydroxybutyric acid and 3-hydroxybutyric acid.

In a further preferred embodiment, the polymers A) are reacted with aromatic hydroxycarboxylic acids B1), i.e with carboxylic acids bearing at least one hydroxyl group on an aromatic hydrocarbyl radical E. Aromatic carboxylic acids are understood to mean compounds which bear at least one carboxyl group bonded to an aromatic system (aryl radical). Aromatic systems are understood to mean cyclic, through-conjugated systems having (4p+2) π electrons, in which p is a natural integer and preferably 1, 2, 3, 4 or 5. The aromatic system may be mono- or polycyclic, for example di- or tricyclic. The aromatic system is preferably formed from carbon atoms. In a further preferred embodiment, it contains, as well as carbon atoms, one or more heteroatoms, for example nitrogen, oxygen and/or sulfur. Examples of such aromatic systems are benzene, naphthalene, phenanthrene, furan and pyridine. The aromatic system may, as well as the carboxyl group and the hydroxyl group, bear one or more, for example one, two, three or more, identical or different further substituents. Suitable further substituents are, for example, alkyl, alkenyl and halogenated alkyl radicals, hydroxyl, hydroxyalkyl, alkoxy, halogen, cyano, nitrile, nitro and/or sulfo groups. These may be bonded to any position in the aromatic system. However, the aryl radical bears at most as many substituents as it has valences.

Preferred examples of aromatic carboxylic acids B1) are alkylaryihydroxycarboxylic acids. These are aromatic carboxylic acids in which the aryl radical bearing the carboxyl group additionally bears at least one alkyl or alkylene radical. Particular preference is given to alkylbenzoic acids which bear at least one alkyl radical having 1 to 20 carbon atoms and especially 1 to 12 carbon atoms, for example 1 to 4 carbon atoms. Further preferred examples are aromatic carboxylic acids whose aryl radical bears one or more, for example two or three, hydroxyl groups and/or hydroxyalkyl groups. Esterification with hydroxyl-bearing polymers A) can result in formation of polycondensates and especially of polycondensates of the polyhydroxycarboxylic acids bonded to the polymer A).

Suitable aromatic carboxylic acids are, for example, the various isomers of hydroxybenzoic acid, hydroxymethylbenzoic acid, hydroxymethoxybenzoic acid, hydroxydimethoxybenzoic acid, hydroxyisophthalic acid, hydroxynaphthalenecarboxylic acid, hydroxypyridinecarboxylic acid and hydroxymethylpyridinecarboxylic acid and hydroxyquinolinecarboxylic acid.

In a further preferred embodiment, the carboxylic acids B1) bear, as well as at least one hydroxyl group, araliphatic hydrocarbyl radicals E. Such araliphatic carboxylic acids bear at least one carboxyl group bonded to an aromatic system via an alkylene or alkenylene radical. The alkylene or alkenylene radical has preferably 1 to 10 carbon atoms and especially 2 to 5 carbon atoms. It may be linear or branched, preferably linear. Preferred alkenylene radicals have one or more, for example one, two or three, double bonds. An aromatic system is understood to mean the aromatic systems already defined above, to which an alkyl radical bearing at least one carboxyl group is bonded. The aromatic systems may themselves in turn bear substituents, for example halogen atoms, halogenated alkyl radicals, $C_1$-$C_{20}$-alkyl, $C_2$-$C_{20}$-alkenyl, $C_1$-$C_5$-alkoxy, for example methoxy, hydroxyl, hydroxyalkyl, ester, amide, cyano, nitrile and/or nitro groups. Examples of preferred araliphatic carboxylic acids are 3-(4-hydroxyphenyl)propionic acid and 4-hydroxyphenoxyacetic acid and mixtures thereof.

Mixtures of various carboxylic acids are also suitable for use in the process according to the invention.

Polycarboxylic acids can also be used as carboxylic acid B1). This results in at least partial esterification of the polycarboxylic acid with hydroxyl groups of various polymer chains, which can lead to an increase in the molecular weight. Preference is given to using polycarboxylic acids in a mixture with monocarboxylic acids. The proportion of the polycarboxylic acids here is preferably between 0.1 and 70 mol %, more preferably between 0.5 and 50 mol % and especially between 1 and 20 mol %, for example between 2 and 10 mol %, based on the total amount of the carboxylic acids used for esterification. Preferred polycarboxylic acids have two, three, four or five carboxyl groups. Particular preference is given to dicarboxylic acids. Suitable polycarboxylic acids are aliphatic polycarboxylic acids, for example lactic acid, malic acid and tartaric acid.

The carboxylic esters B2) suitable in accordance with the invention are esters of the above-listed carboxylic acids B1) with alcohols of the formula $R^5$—OH. $R^5$ is preferably an alkyl radical having 1, 2 or 3 carbon atoms. Particularly preferred alcohols are methanol and ethanol.

Reaction of the hydroxyl-bearing polymers A) with hydroxycarboxylic acids B1) and/or hydroxycarboxylic esters B2) by the process according to the invention can result in formation of polycondensates and especially of polycondensates of the polyhydroxycarboxylic acids bonded to the polymer A). The degree of polycondensation k is preferably between 1 and 1000, more preferably between 2 and 500, for example between 5 and 100. Accordingly, the structural elements (II) of polymer A), in a preferred embodiment, contain polycondensates of the hydroxycarboxylic acid B1) or of the hydroxycarboxylic ester B2) grafted onto the backbone of the hydroxyl-bearing polymer.

Hydroxyl-bearing polymers A) and hydroxycarboxylic acids B1) or hydroxycarboxylic esters B2) are preferably used in a ratio of 100:1 to 1:100, more preferably in a ratio of 10:1 to 1:10 and especially in a ratio of 5:1 to 1:5, based in each case on the molar equivalents of hydroxyl-bearing structures of the formula (I) and the carboxyl groups of the formulae (III) and/or (IV). The ratio of hydroxycarboxylic acids B1) or hydroxycarboxylic esters B2) to hydroxyl groups of the polymer can adjust firstly the degree of modification and secondly the degree of polycondensation of hydroxycarboxylic acid B1) or hydroxycarboxylic ester B2), and hence the properties of the product. If hydroxycarboxylic acid B1) or hydroxycarboxylic ester B2) is used in excess or reacted incompletely, proportions thereof remain unconverted in the polymer, and these can remain in the product or be removed depending on the end use. The esterification of the free hydroxyl groups of polymer A) may accordingly be complete or else only partial. In the case of partial esterification, preferably 1 to 99%, more preferably 2 to 90%, particularly 5 to 70% and especially 10 to 50%, for example 20 to 40%, of the hydroxyl groups are esterified.

The process according to the invention is suitable with particular preference for the partial esterification of hydroxyl-bearing polymers A). This involves using hydroxycarboxylic acid B1) or hydroxycarboxylic ester B2) preferably in substoichiometric amounts, based on the total number of hydroxyl groups, particularly in a ratio of 1:100 to 1:2 and especially in a ratio of 1:50 to 1:5, for example in a ratio of 1:20 to 1:8. Preference is given to adjusting the reaction conditions such that at least 10 mol %, particularly 20 to 100 mol % and especially 25 to 80 mol %, for example 30 to 70 mol %, of the carboxylic acid or fatty acid ester used is converted. These partial esterifications form very homogeneous products, which is shown by a good solubility and a sharp cloud point of aqueous solutions.

The reaction mixture preferably contains 5 to 98% by weight, more preferably 10 to 95% by weight, especially 20 to 90% by weight, for example 50 to 80% by weight, of water, or 5 to 98% by weight, more preferably 10 to 95% by weight, especially 20 to 90% by weight, for example 50 to 80% by weight, of a mixture of water and one or more water-miscible organic solvents. In each case, water is added to the reactants A) and/or B) prior to irradiation with microwaves, such that the reaction product contains an amount of water exceeding the amount of water of reaction released in the esterification.

A multitude of hydroxycarboxylic acids B1) and hydroxycarboxylic esters B1) has good water solubility, and so the reaction thereof with hydroxyl-bearing polymers A) can be performed in aqueous solution. The limited solubility of various hydroxycarboxylic acids B1) and hydroxycarboxylic esters B2) in water often entails the addition of one or more water-miscible organic solvents to the reaction mixture. Preferred water-miscible organic solvents are polar protic, and also polar aprotic liquids. These preferably have a dielectric constant, measured at 25° C., of at least 10 and especially at least 12, for example at least 15. Preferred organic solvents are soluble in water to an extent of at least 100 g/l, more preferably to an extent of at least 200 g/l and particularly to an extent of at least 500 g/l, and are especially completely water-miscible. Particularly preferred solvents are heteroaliphatic compounds and especially alcohols, ketones, end-capped polyethers, carboxamides, for example tertiary carboxamides, nitriles, sulfoxides and sulfones. Preferred aprotic solvents are, for example, formamide, N,N-dimethylformamide (DMF), N,N-dimethylacetamide, acetone, γ-butyrolactone, acetonitrile, sulfolane and dimethyl sulfoxide (DMSO). Preferred protic organic solvents are lower alcohols having 1 to 10 carbon atoms and especially having 2 to 5 carbon atoms. Examples of suitable alcohols are methanol, ethanol, n-propanol, isopropanol, n-butanol, isobutanol, tert-butanol, n-pentanol, 2-pentanol, 3-pentanol, 2-methyl-1-butanol, isoamyl alcohol, 2-methyl-2-butanol, ethylene glycol and glycerol. Particular preference is given to using secondary and tertiary alcohols which are inert under the reaction conditions chosen and have no tendency either to competing esterification or to side reactions such as water elimination. Particular preference is given to secondary and tertiary alcohols having 3 to 5 carbon atoms, for example isopropanol, sec-butanol, 2-pentanol and 2-methyl-2-butanol, and also neopentyl alcohol. Mixtures of the solvents mentioned are also suitable in accordance with the invention.

In general, low-boiling liquids are preferred as water-miscible organic solvents, particularly those which have a boiling point at standard pressure below 150° C. and especially below 120° C., for example below 100° C., and can thus be removed again from the reaction products with a low level of complexity. High-boiling solvents have been found to be useful, especially when they can remain in the product for the further use of the modified polymers. If water-miscible organic solvents are used, the proportion thereof in the solvent mixture is preferably between 1 and 75% by weight, more preferably between 2 and 60% by weight, especially between 5 and 50% by weight, for example between 10 and 30% by weight. Water is present in the solvent mixture ad 100% by weight.

In the case of use of hydroxycarboxylic acids B1) or hydroxycarboxylic esters B2) with limited water solubility, in a preferred embodiment, one or more emulsifiers can be added to the reaction mixture. Preference is given to using emulsifiers which are chemically inert with respect to the reactants and the product. In a particularly preferred embodiment, the emulsifier is reaction product from separate preparation.

The production of the reaction mixture used for the process according to the invention, which comprises a hydroxyl-bearing polymer A), a hydroxycarboxylic acid B1) or a hydroxycarboxylic ester B2), water and optionally a water-miscible solvent and/or further assistants, for example emulsifier and/or catalyst, can be effected in various ways. The mixing of polymer A) and hydroxycarboxylic acid B1) or hydroxycarboxylic ester B2) and optionally the further assistants can be effected continuously, batchwise or else in semibatchwise processes. Especially for processes on the industrial scale, it has been found to be useful to feed the reactants to the process according to the invention in liquid form. For this purpose, preference is given to feeding the hydroxyl-bearing polymer A) to the process according to the invention as a solution in water or as a solution in water and a water-miscible solvent. However, it can also be used in swollen form, if this is pumpable.

The hydroxycarboxylic acid B1) or the hydroxycarboxylic ester B2) can be used as such if they are liquid or meltable at low temperatures of preferably below 150° C. and especially below 100° C. In many cases, it has been found to be useful to admix B1) or B2), optionally in the molten state, with water and/or a water-miscible solvent, for example as a solution, dispersion or emulsion.

The mixing of hydroxyl-bearing polymer A) with hydroxycarboxylic acid B1) or hydroxycarboxylic ester B2) and optionally the further assistants can be performed in a (semi) batchwise process, by sequential charging of the constituents, for example in a separate stirred vessel. In a preferred embodiment, the hydroxycarboxylic acid or the hydroxycarboxylic ester is dissolved in a water-miscible organic solvent and then added to the already dissolved or swollen polymer. Preference is given to addition in small portions over a prolonged period and while stirring, in order firstly to ensure a homogeneous distribution of the hydroxycarboxylic acid or of the hydroxycarboxylic ester and secondly to avoid local precipitation of the polymer at the metering site.

Especially for reactions performed continuously, the reactants, in a preferred embodiment, are fed in the desired ratio from separate reservoirs to the vessel in which the irradiation with microwaves is effected (also referred to hereinafter as reaction vessel). In a further preferred embodiment, prior to entry into the reaction vessel and/or in the reaction vessel itself, they are homogenized further by means of suitable mixing elements, for example a static mixer and/or archimedean screw and/or by flowing through a porous foam.

If used, a catalyst and further assistants can be added to one of the reactants or else to the reactant mixture prior to entry into the reaction vessel. It is also possible to convert solid, pulverulent and heterogeneous systems by the process according to the invention, in which case merely appropriate industrial apparatus for conveying the reaction mixture is required.

According to the invention, the conversion is effected under the influence of microwave radiation, the reaction mixture being heated by the microwave radiation preferably to temperatures above 110° C., more preferably to temperatures between 120 and 230° C., especially between 130 and 210° C. and especially between 140 and 200° C., for example between 150 and 195° C. These temperatures relate to the maximum temperatures attained during the microwave irradiation. The temperature can be measured, for example, at the surface of the irradiation vessel. In the case of reactions performed continuously, it is preferably determined in the reaction mixture directly after it leaves the irradiation zone. The pressure in the reaction vessel is preferably set at such a level that the reaction mixture remains in the liquid state and does not boil. Preference is given to working at pressures above 1 bar, preferably at pressures between 3 and 300 bar, more preferably between 5 and 200 and especially between 10 and 100 bar, for example between 15 and 50 bar.

To accelerate or to complete the reaction between polymer A) and hydroxycarboxylic acid B1) or hydroxycarboxylic ester B2), it has been found to be useful in many cases to work in the presence of acidic catalysts. Catalysts preferred in accordance with the invention are acidic inorganic, organometallic or organic catalysts and mixtures of two or more of these catalysts. Preferred catalysts are liquid and/or soluble in the reaction medium.

Acidic inorganic catalysts in the context of the present invention include, for example, sulfuric acid, phosphoric acid, phosphonic acid, hypophosphorous acid, aluminum sulfate hydrate, alum, acidic silica gel and acidic aluminum hydroxide. In addition, for example, aluminum compounds of the general formula $Al(OR^{15})_3$ and titanates of the general formula $Ti(OR^{15})_4$ are usable as acidic inorganic catalysts, where the $R^{15}$ radicals may each be the same or different and are each independently selected from $C_1$-$C_{10}$-alkyl radicals, for example methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, sec-hexyl, n-heptyl, n-octyl, 2-ethylhexyl, n-nonyl or n-decyl, $C_3$-$C_{12}$-cycloalkyl radicals, for example cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl. The $R^{15}$ radicals in $Al(OR^{15})_3$ or $Ti(OR^{15})_4$ are preferably each the same and are selected from isopropyl, butyl and 2-ethylhexyl.

Preferred acidic organometallic catalysts are, for example, selected from dialkyltin oxides $(R^{15})_2SnO$ where $R^{15}$ is as defined above. A particularly preferred representative of acidic organometallic catalysts is di-n-butyltin oxide, which is commercially available as "Oxo-tin" or as Fascat® brands.

Preferred acidic organic catalysts are acidic organic compounds with, for example, sulfo groups or phosphonic acid groups. Particularly preferred sulfonic acids contain at least one sulfo group and at least one saturated or unsaturated, linear, branched and/or cyclic hydrocarbon radical having 1 to 40 carbon atoms and preferably having 3 to 24 carbon atoms. Especially preferred are aromatic sulfonic acids, especially alkylaromatic monosulfonic acids having one or more $C_1$-$C_{28}$-alkyl radicals and especially those having $C_3$-$C_{22}$-alkyl radicals. Suitable examples are methanesulfonic acid, butanesulfonic acid, benzenesulfonic acid, p-toluenesulfonic acid, xylenesulfonic acid, 2-mesitylenesulfonic acid, 4-ethylbenzenesulfonic acid, isopropylbenzenesulfonic acid, 4-butylbenzenesulfonic acid, 4-octylbenzenesulfonic acid; dodecylbenzenesulfonic acid, didodecylbenzenesulfonic acid, naphthalenesulfonic acid. It is also possible to use acidic ion exchangers as acidic organic catalysts, for example sulfo-bearing crosslinked poly(styrene) resins.

Particular preference for the performance of the process according to the invention is given to sulfuric acid, methanesulfonic acid, p-toluenesulfonic acid, dodecylbenzenesulfonic acid, phosphoric acid, polyphosphoric acid and polystyrenesulfonic acids. Especially preferred are titanates of the general formula $Ti(OR^{15})_4$, and especially titanium tetrabutoxide and titanium tetraisopropoxide.

If the use of acidic inorganic, organometallic or organic catalysts is desired, in accordance with the invention, 0.01 to 10% by weight, preferably 0.02 to 2% by weight, of catalyst is used.

In a further preferred embodiment, the microwave irradiation is performed in the presence of acidic solid catalysts and of catalysts which are insoluble or not fully soluble in the reaction medium. Such heterogeneous catalysts can be suspended in the reaction mixture and exposed to the microwave irradiation together with the reaction mixture. In a particularly preferred continuous embodiment, the reaction mixture, optionally with added solvent, is passed through a fixed bed catalyst fixed in the reaction vessel and especially in the irradiation zone, and exposed to microwave radiation in the process. Suitable solid catalysts are, for example, zeolites, silica gel, montmorillonite and (partly) crosslinked polystyrenesulfonic acid, which may optionally be impregnated with catalytically active metal salts. Suitable acidic ion exchangers based on polystyrenesulfonic acids, which can be used as solid phase catalysts, are obtainable, for example, from Rohm & Haas under the Amberlyst® brand name.

To accelerate or to complete the reaction between polymer A) and hydroxycarboxylic ester B2), it has been found to be useful in many cases to work in the presence of basic catalysts or mixtures of two or more of these catalysts. The basic catalysts used in the context of the present invention are quite generally those basic compounds which are suitable for accelerating the transesterification of hydroxycarboxylic esters with alcohols. Examples of suitable catalysts are inorganic and organic bases, for example metal hydroxides, oxides, carbonates or alkoxides. In a preferred embodiment, the basic catalyst is selected from the group of the hydroxides, oxides, carbonates and alkoxides of alkali metals and alkaline earth metals. Very particular preference is given to lithium hydroxide, sodium hydroxide, potassium hydroxide, sodium methoxide, potassium methoxide, sodium carbonate and potassium carbonate. Cyanide ions are also suitable as a catalyst. These substances can be used in solid form or as a solution, for example as an aqueous or alcoholic solution. The amount of the catalysts used depends on the activity and stability of the catalyst under the reaction conditions chosen and should be matched to the particular reaction. The amount of the catalyst to be used may vary within wide limits. Particular preference is given to using catalytic amounts of the abovementioned reaction-accelerating compounds, preferably in the range between 0.001 and 10% by weight, more preferably in the range from 0.01 to 5% by weight, for example between 0.02 and 2% by weight, based on the amount of hydroxycarboxylic ester B2) used.

After the microwave irradiation, the reaction mixture in many cases can be sent directly to a further use. In order to obtain solvent-free products, water any organic solvent present can be removed from the crude product by customary separation processes, for example phase separation, distillation, freeze-drying or absorption. At the same time, it is also possible to additionally remove reactants used in excess and any unconverted residual amounts of the reactants. For specific requirements, the crude products can be purified further by customary purifying processes, for example washing, reprecipitation, filtration or chromatographic processes. It has often also been found to be successful here to neutralize excess or unconverted hydroxycarboxylic acid and to remove it by washing.

The microwave irradiation is typically performed in instruments which possess a reaction vessel (also referred to hereinafter as irradiation vessel) made from a very substantially microwave-transparent material, into which microwave radiation generated in a microwave generator is injected. Microwave generators, for example the magnetron, the klystron and the gyrotron, are known to those skilled in the art.

The reaction vessels used to perform the process according to the invention are preferably manufactured from substantially microwave-transparent, high-melting material or comprise at least parts, for example windows, made of these materials.

Particular preference is given to using nonmetallic reaction vessels. Substantially microwave-transparent materials are understood here to mean those which absorb a minimum amount of microwave energy and convert it to heat. A measure often employed for the ability of a substance to absorb microwave energy and convert it to heat is the dielectric loss factor $\tan \delta = \in''/\in'$. The dielectric loss factor $\tan \delta$ is defined as the ratio of dielectric loss $\in''$ and dielectric constant $\in'$. Examples of $\tan \delta$ values of different materials are reproduced, for example, in D. Bogdal, Microwave-assisted Organic Synthesis, Elsevier 2005. For reaction vessels suitable in accordance with the invention, materials with $\tan \delta$ values measured at 2.45 GHz and 25° C. of less than 0.01, particularly less than 0.005 and especially less than 0.001 are preferred. Preferred microwave-transparent and thermally stable materials include primarily mineral-based materials, for example quartz, alumina, zirconia, silicon nitride and the like. Also suitable as vessel materials are thermally stable plastics such as, more particularly, fluoropolymers, for example Teflon, and industrial plastics such as polypropylene, or polyaryl ether ketones, for example glass fiber reinforced polyetheretherketone (PEEK). In order to withstand the temperature conditions during the reaction, especially minerals, such as quartz or alumina, coated with these plastics have been found to be useful as vessel materials.

Microwaves refer to electromagnetic rays with a wavelength between about 1 cm and 1 m and frequencies between about 300 MHz and 30 GHz. This frequency range is suitable in principle for the process according to the invention. For the process according to the invention, preference is given to using microwave radiation with frequencies approved for industrial, scientific and medical applications, for example with frequencies of 915 MHz, 2.45 GHz, 5.8 GHz or 24.12 GHz. The microwave irradiation of the reaction mixture can be effected either in microwave applicators which work in monomode or quasi-monomode, or in those which work in multimode. Corresponding instruments are known to those skilled in the art.

The microwave power to be injected into the reaction vessel for the performance of the process according to the invention is dependent especially on the target reaction temperature, the geometry of the reaction vessel and the associated reaction volume, and, in the case of reactions performed continuously, on the flow rate of the reaction mixture through the reaction vessel. It is typically between 100 W and several hundreds of kW and especially between 200 W and 100 kW, for example between 500 W and 70 kW. It can be applied at one or more points in the reaction vessel. It can be generated by means of one or more microwave generators.

The duration of the microwave irradiation depends on various factors, such as the reaction volume, the geometry of the reaction vessel, the desired residence time of the reaction mixture at reaction temperature, and the desired degree of conversion. Typically, the microwave irradiation is undertaken over a period of less than 30 minutes, preferably between 0.01 second and 15 minutes, more preferably between 0.1 second and 10 minutes, and especially between one second and 5 minutes, for example between 5 seconds and 2 minutes. The intensity (power) of the microwave radiation is adjusted such that the reaction mixture attains the target reaction temperature within a minimum time. In a further preferred embodiment of the process according to the invention, it has been found to be useful to supply the reaction mixture to the reaction vessel in heated form. This lowers the viscosity of the reaction mixture and improves the homogeneity thereof. To maintain the reaction temperature, the reaction mixture can be irradiated further with reduced and/or pulsed power, or kept to temperature by some other means. In a preferred embodiment, the reaction product is cooled directly after the microwave irradiation has ended, very rapidly to temperatures below 100° C., preferably below 80° C. and especially below 50° C.

The microwave irradiation can be performed batchwise in a batch process, or preferably continuously, for example in a flow tube which serves as the reaction vessel, which is also referred to hereinafter as reaction tube. It can additionally be performed in semibatchwise processes, for example continuous stirred reactors or cascade reactors. In a preferred embodiment, the reaction is performed in a closed, pressure-resistant and chemically inert vessel, in which case the water and in some cases the reactants lead to a pressure buildup. After the reaction has ended, the elevated pressure can be used, by decompression, to volatilize and remove water and any excess acid and/or cool the reaction product. In a particularly preferred embodiment, the reaction mixture, after the microwave irradiation has ended or after leaving the reaction vessel, is freed very rapidly from water and any catalytically active species present, in order to avoid hydrolysis of the ester formed.

In a preferred embodiment, the process according to the invention is performed in a batchwise microwave reactor in which a particular amount of the reaction mixture is charged into an irradiation vessel, irradiated with microwaves and then worked up. The microwave irradiation is preferably undertaken in a pressure-resistant stirred vessel. If the reaction vessel is manufactured from a microwave-transparent material or possesses microwave-transparent windows, the microwaves can be injected into the reaction vessel through the vessel wall. However, the microwaves can also be injected into the reaction vessel via antennas, probes or hollow conductor systems. For the irradiation of relatively large reaction volumes, preference is given here to using a microwave applicator operated in multimode. Through variation of the microwave power, the batchwise embodiment of the process according to the invention allows rapid and also slow heating rates, and especially the holding of the temperature over prolonged periods, for example several hours. In a preferred embodiment, the aqueous reaction mixture is initially charged in the irradiation vessel before commencement of the microwave irradiation. It preferably has temperatures below 100° C., for example between 10 and 50° C. In a further preferred embodiment, the reactants and water or portions thereof are supplied to the irradiation vessel only during the irradiation with microwaves. In a further preferred embodiment, the batchwise microwave reactor is operated with continuous supply of reactants and simultaneous discharge of reaction mixture in the form of a semibatchwise or cascade reactor.

In a particularly preferred embodiment, the process according to the invention is performed in a continuous microwave reactor. To this end, the reaction mixture is conducted continuously through a pressure-resistant reaction tube which is inert with respect to the reactants, is very substantially microwave-transparent, has been installed into a microwave applicator and serves as the irradiation vessel. This reaction tube preferably has a diameter of one millimeter to approx. 50 cm, especially between 2 mm and 35 cm, for example between 5 mm and 15 cm. The diameter of the reaction tube is more preferably less than the penetration depth of the microwaves into the reaction mixture to be irradiated. It is particularly 1 to 70% and especially 5 to 60%, for example 10 to 50%, of the penetration depth. Penetration depth is understood to mean the distance over which the incident microwave energy is attenuated to 1/e.

Reaction or flow tubes are understood here to mean irradiation vessels in which the ratio of length to diameter of the irradiation zone (this is understood to mean the portion of the flow tube in which the reaction mixture is exposed to microwave radiation) is greater than 5, preferably between 10 and 100 000, more preferably between 20 and 10 000, for example between 30 and 1000. They may, for example, be straight or curved, or else take the form of a pipe coil. In a specific embodiment, the reaction tube is configured in the form of a jacketed tube through whose interior and exterior the reaction mixture can be conducted successively in countercurrent, in order, for example, to increase the thermal conduction and energy efficiency of the process. The length of the reaction tube is understood to mean the total distance through which the reaction mixture flows in the microwave field. Over its length, the reaction tube is surrounded by at least one microwave radiator, but preferably by more than one, for example two, three, four, five, six, seven, eight or more microwave radiators. The microwaves are preferably injected through the tube jacket. In a further preferred embodiment, the microwaves are injected by means of at least one antenna via the tube ends.

The reaction tube is typically provided at the inlet with a metering pump and a manometer, and at the outlet with a pressure-retaining valve and a heat exchanger. Preferably, the reaction mixture is fed to the reaction tube in liquid form with temperatures below 100° C., for example between 10° C. and 90° C. In a further preferred embodiment, a solution of the polymer and carboxylic acid or carboxylic ester is mixed only shortly prior to entry into the reaction tube, optionally with the aid of suitable mixing elements, for example static mixers and/or archimedean screw and/or by flowing through a porous foam. In a further preferred embodiment, they are homogenized further in the reaction tube by means of suitable mixing elements, for example a static mixer and/or archimedean screw and/or by flowing through a porous foam.

Through variation of tube cross section, length of the irradiation zone, flow rate, geometry of the microwave radiators, the incident microwave power and the temperature attained, the reaction conditions are adjusted such that the maximum reaction temperature is achieved very rapidly. In a preferred embodiment, the residence time chosen at maximum temperature is short, such that as low as possible a level of side reactions and further reactions occurs.

Preferably, the continuous microwave reactor is operated in monomode or quasi-monomode. The residence time of the reaction mixture in the irradiation zone is generally below 20 minutes, preferably between 0.01 second and 10 minutes, preferably between 0.1 second and 5 minutes, for example between one second and 3 minutes. To complete the reaction, the reaction mixture, optionally after intermediate cooling, can flow through the irradiation zone several times.

In a particularly preferred embodiment, the irradiation of the reaction mixture with microwaves is effected in a reaction tube whose longitudinal axis is in the direction of propagation of the microwaves in a monomode microwave applicator. The length of the irradiation zone is preferably at least half the wavelength, more preferably at least one wavelength and up to 20 times, especially 2 to 15 times, for example 3 to 10 times, the wavelength of the microwave radiation used. With this geometry, energy from a plurality of, for example two, three, four, five, six or more, successive maxima of the microwave which propagates parallel to the longitudinal axis of the tube can be transferred to the reaction mixture, which distinctly improves the energy efficiency of the process.

The irradiation of the reaction mixture with microwaves is preferably effected in a substantially microwave-transparent straight reaction tube within a hollow conductor which functions as a microwave applicator and is connected to a microwave generator. The reaction tube is preferably aligned axially with a central axis of symmetry of this hollow conductor. The hollow conductor preferably takes the form of a cavity resonator. The length of the cavity resonator is preferably such that a standing wave forms therein. Additionally preferably, the microwaves not absorbed in the hollow conductor are reflected at the end thereof. Configuration of the microwave applicator as a resonator of the reflection type achieves a local increase in the electrical field strength at the same power supplied by the generator and increased energy exploitation.

The cavity resonator is preferably operated in $E_{01n}$ mode where n is an integer and specifies the number of field maxima of the microwave along the central axis of symmetry of the resonator. In this mode of operation, the electrical field is directed in the direction of the central axis of symmetry of the cavity resonator. It has a maximum in the region of the central axis of symmetry and decreases to the value of zero toward the outer surface. This field configuration is rotationally symmetric about the central axis of symmetry. Use of a cavity resonator with a length where n is an integer enables the formation of a standing wave. According to the desired flow rate of the reaction mixture through the reaction tube, the temperature required and the residence time required in the resonator, the length of the resonator is selected relative to the wavelength of the microwave radiation used. n is preferably an integer from 1 to 200, more preferably from 2 to 100, particularly from 3 to 50, especially from 4 to 20, for example three, four, five, six, seven, eight, nine or ten.

The $E_{01n}$ mode of the cavity resonator is also referred to in English as the $TM_{01n}$ (transversal magnetic) mode; see, for example, K. Lange, K. H. Löcherer, "Taschenbuch der Hochfrequenztechnik" [Handbook of High-Frequency Technology], volume 2, pages K21 ff.

The microwave energy can be injected into the hollow conductor which functions as the microwave applicator through holes or slots of suitable dimensions. In a specific embodiment of the process according to the invention, the reaction mixture is irradiated with microwaves in a reaction tube present in a hollow conductor with coaxial crossing of the microwaves. Microwave devices particularly preferred for this process are formed from a cavity resonator, a coupling device for injecting a microwave field into the cavity resonator and with one orifice each on two opposite end walls for passage of the reaction tube through the resonator. The microwaves are preferably injected into the cavity resonator by means of a coupling pin which projects into the cavity resonator. The coupling pin is preferably configured as a preferably metallic inner conductor tube which functions as a coupling antenna. In a particularly preferred embodiment, this coupling pin projects through one of the end orifices into the cavity resonator. The reaction tube more preferably adjoins the inner conductor tube of the coaxial crossing, and is especially conducted through the cavity thereof into the cavity resonator. The reaction tube is preferably aligned axially with a central axis of symmetry of the cavity resonator, for which the cavity resonator preferably has a central orifice on each of two opposite end walls to pass the reaction tube through.

The microwaves can be fed into the coupling pin or into the inner conductor tube which functions as a coupling antenna, for example, by means of a coaxial connecting line. In a preferred embodiment, the microwave field is supplied to the resonator via a hollow conductor, in which case the end of the coupling pin projecting out of the cavity resonator is conducted into the hollow conductor through an orifice in the wall of the hollow conductor, and takes microwave energy from the hollow conductor and injects it into the resonator.

In a specific embodiment, the reaction mixture is irradiated with microwaves in a microwave-transparent reaction tube which is axially symmetric within an $E_{01n}$ round hollow conductor with coaxial crossing of the microwaves. The reaction tube is conducted through the cavity of an inner conductor tube which functions as a coupling antenna into the cavity resonator. In a further preferred embodiment, the salt is irradiated with microwaves in a microwave-transparent reaction tube which is conducted through an $E_{01n}$ cavity resonator with axial introduction of the microwaves, the length of the cavity resonator being such as to form n=2 or more field maxima of the microwave. In a further preferred embodiment, the reaction mixture is irradiated with microwaves in a microwave-transparent reaction tube which is conducted through an $E_{01n}$ cavity resonator with axial introduction of the microwaves, the length of the cavity resonator being such as to form a standing wave with n=2 or more field maxima of the microwave. In a further preferred embodiment, the reaction mixture is irradiated with microwaves in a microwave-transparent reaction tube which is axially symmetric within a circular cylindrical $E_{on}$ cavity resonator with coaxial crossing of the microwaves, the length of the cavity resonator being such as to form n=2 or more field maxima of the microwave. In a further preferred embodiment, the reaction mixture is irradiated with microwaves in a microwave-transparent reaction tube which is axially symmetric within a circular cylindrical $E_{01n}$ cavity resonator with coaxial crossing of the microwaves, the length of the cavity resonator being such as to form a standing wave with n=2 or more field maxima of the microwave.

$E_{01}$ cavity resonators particularly suitable for the process according to the invention preferably have a diameter which corresponds to at least half the wavelength of the microwave radiation used. The diameter of the cavity resonator is preferably 1.0 to 10 times, more preferably 1.1 to 5 times and especially 2.1 to 2.6 times half the wavelength of the microwave radiation used. The $E_{01}$ cavity resonator preferably has a round cross section, which is also referred to as an $E_{01}$ round hollow conductor. It more preferably has a cylindrical shape and especially a circular cylindrical shape.

In the case of continuous performance of the process according to the invention, the reaction mixture is often not yet in chemical equilibrium when it leaves the irradiation zone. In a preferred embodiment, the reaction mixture is therefore, after passing through the irradiation zone, transferred directly, i.e. without intermediate cooling, into an isothermal reaction zone in which it continues to be kept at reaction temperature for a certain time. Only after leaving the isothermal reaction zone is the reaction mixture optionally decompressed and cooled. Direct transfer from the irradiation zone to the isothermal reaction zone is understood to mean that no active measures are taken for supply and more particularly for removal of heat between irradiation zone and isothermal reaction zone. Preferably, the temperature difference between departure from the irradiation zone and entry into the isothermal reaction zone is less than ±30° C., preferably less than ±20° C., more preferably less than ±10° C. and especially less than ±5° C. In a specific embodiment, the temperature of the reaction mixture on entry into the isothermal reaction zone corresponds to the temperature on departure from the irradiation zone. This embodiment enables rapid and controlled heating of the reaction mixture to the desired reaction temperature without partial overheating, and then residence at this reaction temperature for a defined period. In this embodiment, the reaction mixture is preferably, directly after leaving the isothermal reaction zone, cooled very rapidly to temperatures below 120° C., preferably below 100° C. and especially below 60° C.

Useful isothermal reaction zones include all chemically inert vessels which enable residence of the reaction mixture at the temperature established in the irradiation zone. An isothermal reaction zone is understood to mean that the temperature of the reaction mixture in the isothermal reaction zone relative to the entrance temperature is kept constant within ±30° C., preferably within ±20° C., more preferably within ±10° C. and especially within ±5° C. Thus, the reaction mixture on departure from the isothermal reaction zone has a temperature which deviates from the temperature on entry into the isothermal reaction zone by not more than ±30° C., preferably ±20° C., more preferably ±10° C. and especially ±5° C.

In addition to continuous stirred tanks and tank cascades, especially tubes are suitable as the isothermal reaction zone. These reaction zones may consist of different materials, for example metals, ceramic, glass, quartz or plastics, with the proviso that they are mechanically stable and chemically inert under the selected temperature and pressure conditions. It has been found that thermally insulated vessels are particularly useful. The residence time of the reaction mixture in the isothermal reaction zone can be adjusted, for example, via the volume of the isothermal reaction zone. In the case of use of stirred tanks and tank cascades, it has been found to be equally useful to establish the residence time via the fill level of the tanks. In a preferred embodiment, the isothermal reaction zone is equipped with active or passive mixing elements.

In a preferred embodiment, the isothermal reaction zone used is a tube. This may be an extension of the microwave-transparent reaction tube downstream of the irradiation zone, or else a separate tube of the same or different material connected to the reaction tube. For a given flow rate, the residence time of the reaction mixture can be determined over the length of the tube and/or cross section thereof. The tube which functions as the isothermal reaction zone is thermally insulated in the simplest case, such that the temperature which exists on entry of the reaction mixture into the isothermal reaction zone is held within the limits given above. However, it is also possible, for example by means of a heat carrier or cooling medium, to supply energy in a controlled manner to the reaction mixture in the isothermal reaction zone, or remove it therefrom. This embodiment has been found to be useful especially for startup of the apparatus or of the process. For example, the isothermal reaction zone may be configured as a tube coil or as a tube bundle which is within a heating or cooling bath or is charged with a heating or cooling medium in the form of a jacketed tube. The isothermal reaction zone may also be within a further microwave applicator in which the reaction mixture is treated once again with microwaves. In this case, it is possible to use either monomode or multimode applicators.

The residence time of the reaction mixture in the isothermal reaction zone is preferably such that the thermal equilibrium state defined by the existing conditions is attained. Typically, the residence time is between 1 second and 10 hours, preferably between 10 seconds and 2 hours, more preferably between 20 seconds and 60 minutes, for example between 30 seconds and 30 minutes. Additionally preferably, the ratio between residence time of the reaction mixture in the isothermal reaction zone and residence time in the irradiation zone is between 1:2 and 100:1, more preferably 1:1 to 50:1 and especially between 1:1.5 and 10:1.

To achieve particularly high conversions, it has been found to be useful in many cases to expose the reaction product obtained again to microwave irradiation, in which case it is optionally possible to make up the ratio of the reactants used to compensate for spent or deficient reactants.

The process according to the invention enables the polymer-analogous modification of hydroxyl-bearing polymers and especially of polyvinyl alcohol with hydroxycarboxylic acids or hydroxycarboxylic esters in both continuous and batchwise processes, and hence in volumes of industrial interest. Aside from water or lower alcohol, this does not give rise to any by-products which have to be disposed of and pollute the environment. A further advantage of the process according to the invention lies in the surprising observation that the polymer-analogous condensation reactions can be undertaken in aqueous solution, since water is the solvent of best suitability both for hydroxyl-bearing polymers and for most hydroxycarboxylic acids, and is additionally advantageous from environmental aspects. The addition of particular polar organic solvents can facilitate the reaction with less water-soluble hydroxycarboxylic acids or esters thereof. More particularly, the process according to the invention is suitable for partial esterifications of hydroxyl-bearing polymers, since the reaction mixtures, in spite of differences in viscosity between hydroxyl-bearing polymers A) and hydroxycarboxylic acids B1) or hydroxycarboxylic esters B2), lead to a homogeneous distribution of the hydroxycarboxylic acid residues over the entire chain length of the polymer. The process according to the invention allows the reproducible preparation of products modified randomly along their chain length. The variety of hydroxycarboxylic acids and hydroxycarboxylic esters available in industrial volumes for the process according to the invention opens up a wide range of possible modifications. By the process according to the invention, it is possible through suitable choice of the hydroxycarboxylic acid to modify in a controlled manner, for example, swelling characteristics, solubility in water or organic solvents, adhesion on substrates of different polarity, mechanical strength and thermal stability of the polymers. For instance, reaction with hydroxycarboxylic acids or esters thereof further improves the water solubility of the polymers, especially in cold water. At the same time, there is a distinct rise in the tensile strength of the polymers with substantially unchanged extensibility, without any significant increase in the solution viscosity thereof, and they can thus be applied by established processes. The polymers modified by the process according to the invention can be used in various ways, for example as fiber sizes, adhesives, emulsifiers, lamination for safety glass and plastics, paper coating, thickeners for latices, binders for fertilizers, as water-soluble and water-insoluble films, for example as spontaneously disintegrating packing films, as an additive to inks and concrete, and as a temporary, water-removable surface guard.

EXAMPLES

The batchwise microwave irradiation was effected in a Biotage "Initiator®" single-mode microwave reactor at a frequency of 2.45 GHz. The temperature was measured by means of an IR sensor. The reaction vessels used were closed, pressure-resistant glass cuvettes (pressure vials) having a capacity of 20 ml, in which homogenization was effected by magnetic stirring.

The microwave power over the experiment duration was in each case set such that the desired temperature of the reaction mixture was attained as rapidly as possible and then was kept constant over the period specified in the experimental descriptions. After the microwave irradiation had been ended, the glass cuvette was cooled with compressed air.

Continuous irradiations of the reaction mixtures with microwaves were effected in an alumina reaction tube (60×1 cm) which was present in axial symmetry in a cylindrical cavity resonator (60×10 cm). At one of the ends of the cavity resonator, the reaction tube ran through the cavity of an inner conductor tube which functions as a coupling antenna. The microwave field with a frequency of 2.45 GHz, generated by a magnetron, was injected into the cavity resonator by means of the coupling antenna ($E_{01}$ cavity applicator; monomode), in which a standing wave formed. In the case of use of an isothermal reaction zone, the heated reaction mixtures, immediately after leaving the reaction tube, were conveyed through a thermally insulated stainless steel tube (3.0 m×1 cm, unless stated otherwise). After leaving the reaction tube, or after leaving the isothermal reaction zone in the case of use thereof, the reaction mixtures were decompressed to atmospheric pressure, and cooled immediately to the temperature specified by means of an intensive heat exchanger.

The microwave power was adjusted over the experimental duration in each case in such a way that the desired temperature of the reaction mixture at the end of the irradiation zone was kept constant. The microwave powers specified in the experimental descriptions therefore represent the mean value of the incident microwave power over time. The measurement of the temperature of the reaction mixture was undertaken directly after departure from the irradiation zone by means of a Pt100 temperature sensor. Microwave energy not absorbed directly by the reaction mixture was reflected at the opposite end of the cavity resonator from the coupling antenna; the microwave energy which was also not absorbed by the reaction mixture on the return path and reflected back in the direction of the magnetron was passed with the aid of a prism system (circulator) into a water-containing vessel. The difference between energy injected and heating of this water load was used to calculate the microwave energy introduced in the irradiation zone.

By means of a high-pressure pump and of a pressure-relief valve, the reaction mixture in the reaction tube was placed under such a working pressure that was sufficient always to keep all reactants and products or condensation products in the liquid state. The reaction mixtures were pumped through the apparatus at a constant flow rate and the residence time in the reaction tube was adjusted by modifying the flow rate.

The reaction products were analyzed by means of $^1$H NMR spectroscopy at 500 MHz in $CDCl_3$. Polyvinyl alcohol is also abbreviated here to PVA.

Example 1

Continuous Esterification of Poly(Vinyl Alcohol) with Lactic Acid

A 10 l Büchi stirred autoclave with gas inlet tube, stirrer, internal thermometer and pressure equalizer was initially charged with a solution of 1.4 kg of polyvinyl alcohol (Mowiol® 4-98, molecular weight 27 000 g/mol, hydrolysis level 98%) in 5.6 kg of water, 25 g of p-toluenesulfonic acid were added, and the mixture was heated to 55° C. At this temperature, a solution of 0.85 kg of lactic acid in the form of Lactol 90 (90% solution in water; 8.5 mol of lactic acid) in 1 kg of isopropanol was added while stirring over a period of one hour.

The reaction mixture thus obtained was pumped continuously through the reaction tube at 4.8 l/h and a working pressure of 35 bar and exposed to a microwave power of 2.0 kW, 88% of which was absorbed by the reaction mixture. The residence time of the reaction mixture in the irradiation zone was about 50 seconds. On departure from the irradiation zone, the reaction mixture had a temperature of 186° C. and was transferred directly at this temperature to the isothermal reaction zone. At the end of the isothermal reaction zone, the reaction mixture had a temperature of 172° C. Directly after leaving the reaction zone, the reaction mixture was cooled to room temperature and adjusted to pH 4 with hydrogencarbonate solution.

The reaction product was a homogeneous, pale yellowish solution with low viscosity. Evaporating off the solvent and reprecipitating the residue with methanol from aqueous solution resulted in a viscous material, the IR spectrum of which shows bands characteristic of esters at 1735 $cm^{-1}$ and 1245 $cm^{-1}$ with a distinctly increased intensity compared to the polyvinyl alcohol used. Characteristic signals in the $^1$H NMR spectrum at 4.4 ppm indicate methine protons of the esterified polyvinyl alcohol. Comparison of this signal with the signals of the other methine protons of the PVA backbone between 3.5 and 4.1 ppm gives an estimated conversion of 17 mol % of the alcohol groups of the polyvinyl alcohol used. A broad multiplet at 5.2 ppm additionally indicates the presence of oligomeric lactic acid units.

Example 2

Continuous Esterification of Poly(Vinyl Alcohol) Mowiol® 18-88 with Lactic Acid

A 10 l Büchi stirred autoclave with gas inlet tube, stirrer, internal thermometer and pressure equalizer was initially charged with a solution of 500 g of polyvinyl alcohol (Mowiol® 18-88, molecular weight 130 000 g/mol, hydrolysis level 88%) in 6.5 kg of water, 10 g of p-toluenesulfonic acid were added, and the mixture was heated to 50° C. At this temperature, a solution of 400 g of lactic acid in the form of Lactol 90 (4 mol of lactic acid) in 2 kg of isopropanol was added while stirring over a period of one hour.

The reaction mixture thus obtained was pumped continuously through the reaction tube at 5 l/h and a working pressure of 35 bar and exposed to a microwave power of 2.3 kW, 91% of which was absorbed by the reaction mixture. The residence time of the reaction mixture in the irradiation zone was about 48 seconds. On departure from the irradiation zone, the reaction mixture had a temperature of 192° C. and was transferred directly at this temperature to the isothermal reaction zone. At the end of the isothermal reaction zone, the reaction mixture had a temperature of 185° C. Directly after leaving the reaction zone, the reaction mixture was cooled to room temperature and adjusted to pH 4 with hydrogencarbonate solution.

The reaction product was a homogeneous, pale yellowish, viscous solution. Evaporating off the solvent resulted in a viscous material, the IR spectrum of which shows bands characteristic of esters at 1735 cm$^{-1}$ and 1245 cm$^{-1}$ with a distinctly increased intensity compared to the polyvinyl alcohol used. Evaporating off the solvent and reprecipitating the residue with methanol from aqueous solution resulted in a viscous material, the IR spectrum of which shows bands characteristic of esters at 1735 cm$^{-1}$ with a distinctly increased intensity compared to the polyvinyl alcohol used. Characteristic signals in the $^1$H NMR spectrum at 4.4 ppm indicate methine protons esterified polyvinyl alcohol. Comparison of this signal with the signals of the other methine protons of the PVA backbone between 3.5 and 4.1 ppm gives an estimated conversion of 23 mol % of the alcohol groups of the polyvinyl alcohol used. A broad multiplet at 5.2 ppm additionally indicates the presence of oligomeric lactic acid units.

Example 3

Continuous Esterification of Poly(Vinyl Alcohol) with 4-Hydroxybutyric Acid

A 10 l Büchi stirred autoclave with gas inlet tube, stirrer, internal thermometer and pressure equalizer was initially charged with a solution of 1.4 kg of polyvinyl alcohol (Mowiol® 4-98, molecular weight 27 000 g/mol; hydrolysis level 98%) in 6 kg of water, 20 g of p-toluenesulfonic acid were added, and the mixture was heated to 50° C. At this temperature, a solution of 1.04 kg of 4-hydroxybutyric acid (10 mol) in 1 kg of isopropanol was added with stirring over a period of one hour.

The reaction mixture thus obtained was pumped continuously through the reaction tube at 5 l/h and a working pressure of 34 bar and exposed to a microwave power of 2.2 kW, 90% of which was absorbed by the reaction mixture. The residence time of the reaction mixture in the irradiation zone was about 48 seconds. On departure from the irradiation zone, the reaction mixture had a temperature of 195° C. and was transferred directly at this temperature to the isothermal reaction zone. At the end of the isothermal reaction zone, the reaction mixture had a temperature of 188° C. Directly after leaving the reaction zone, the reaction mixture was cooled to room temperature and the catalyst was neutralized with hydrogencarbonate solution.

The reaction product was a homogeneous, colorless solution with low viscosity. Evaporating off the solvent and reprecipitating the residue with methanol from aqueous solution resulted in a viscous material, the IR spectrum of which shows bands characteristic of esters at 1735 cm$^{-1}$ and 1245 cm$^{-1}$ with a distinctly increased intensity compared to the polyvinyl alcohol used. Characteristic signals in the $^1$H NMR spectrum at 4.5 ppm indicate the formation of esters of polyvinyl alcohol (methine proton adjacent to the ester moiety). Comparison of the integral of these signals with the signals of the methylene protons of the PVA backbone between 1.5 and 1.8 ppm gives an estimated conversion of 20 mol % of the alcohol groups of the PVA used.

Example 4

Esterification of Poly(Vinyl Alcohol) with Tartaric Acid 10 ml of a mixture of 4 g of polyvinyl alcohol (Mowiol® 4-88, molecular weight 31 000 g/mol; hydrolysis level 88%) in 6 g of water and 4 g of isopropanol, 50 mg of p-toluenesulfonic acid and 0.5 g of tartaric acid were heated in a batchwise microwave reactor to a temperature of 185° C., in the course of which a pressure of about 19 bar was established. On attainment of thermal equilibrium (after about 1 minute), this temperature and this pressure were maintained under further microwave irradiation for 15 minutes. After the microwave irradiation had ended, the reaction mixture was cooled to room temperature and the catalyst was neutralized with hydrogencarbonate solution.

The reaction product was a homogeneous, colorless, viscous, opalescent solution. Evaporating off the solvent resulted in a homogeneous, non-tacky film, the IR spectrum of which shows bands characteristic of esters of polyvinyl alcohol at 1735 cm$^{-1}$ and 1245 cm$^{-1}$ with an increased intensity compared to the polyvinyl alcohol used. Attempts to dissolve the dried reaction product in DMF or DMSO failed, which indicates the expected crosslinking of the polyvinyl alcohol. Merely swelling to about twice the mass (by calculation) of the polymer used was observed after a few hours.

To characterize the properties of the modified polymers, the following methods were employed:

Method 1) Preparation of Polymer Solutions:

500 ml of demineralized water are heated to 90° C. and then the required amount of (modified) polymer is sprinkled in gradually while stirring constantly, such that no lumps form and a clear solution is obtained. After cooling, the volume, which has decreased as a result of vaporization, is made back up to 500 ml with demineralized water.

Method 2) Production of a Polymer Film:

100 ml of a 6% by weight polymer solution (6% by weight based on dry content) are poured onto a commercial film casting plate and the solution is dried at room temperature under air for 2-3 days. Films which are used to determine film solubility are additionally dyed with Patent Blue V solution (10 ml per 100 ml of polymer solution).

Method 3) Determination of Film Solubility:

From a polymer film produced as described above, a piece of about 2×2 cm in size is cut out and clamped in a frame. The frame is suspended in the solvent to be tested at the temperature to be tested (for example water at 80° C.) and the solvent is stirred slowly. A stopwatch is used to measure the time until complete dissolution of the film. If the film is yet to fully dissolve after 600 s (=10 min), the film is described as "insoluble"; otherwise, the time until full dissolution is noted.

Method 4) Determination of the Mechanical Properties of the Polymer Film:

From a polymer film produced as described above (without addition of Patent Blue V solution), a piece of about 10×2 cm in size is cut out and subjected to a tensile strain experiment with a commercial apparatus. The tensile strength indicates the maximum force that the film withstands before tearing.

Method 5) Determination of the Viscosity of Polymer Solutions:

The above-described process for preparing polymer solutions is used to prepare a 4% by weight polymer solution (based on dry content) and the viscosity thereof is determined at 20° C. with a commercial Brookfield viscometer at 20 revolutions per minute (rpm). The choice of a suitable spindle is made according to the viscosity of the solution.

By these methods, the following data were found for the polyvinyl alcohols used and the modified polymers:

| Product | Viscosity [mPa·s] | Solubility at 20° C. | Solubility at 80° C. | Max. force [N/mm²] | Breaking force [N/mm²] | Elongation [%] |
|---|---|---|---|---|---|---|
| Mowiol ® 4-98 (comp.) | 4.4 | insoluble | 480 s | 53 | 35 | 120 |
| Mowiol 18-88 (comp.) | 17.6 | insoluble | insoluble | 49 | 36 | 210 |
| Example 1 | 4.5 | 180 s | 30 s | 250 | 182 | 150 |
| Example 2 | 18.3 | 240 s | 50 s | 280 | 230 | 300 |
| Example 3 | 4.2 | 200 s | 40 s | 320 | 196 | 180 |

Compared to the parent poly(vinyl alcohols), the modified polymers exhibit a distinct improvement in solubility in water at 20° C., and also at 80° C. While the unmodified poly(vinyl alcohols) are completely insoluble at room temperature (20° C.), the modified polymers dissolve completely within 3 minutes. At both temperatures, there are no signs of the presence of polymer components having different solubility. The modified films have a distinctly increased tensile strength compared to known polyvinyl alcohols, coupled with slightly increased extensibility. However, the solution viscosity of the polymers remains substantially unchanged as a result of the modification, and so the modified polymers can be applied like standard products.

The invention claimed is:

1. A process for preparing an ester of a hydroxyl-bearing polymer containing repeat structural units of the formulae (I) and (II) in alternating or random sequence

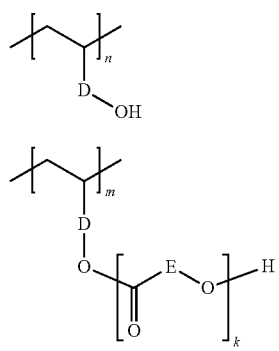

in which
D is a direct bond between polymer backbone and hydroxyl group, a $C_1$- to $C_6$-alkylene group, a $C_5$- to $C_{12}$-arylene group, an oxyalkylene group of the formula —O—$R^2$—, an ester group of the formula —C(O)—O—$R^2$— or an amide group of the formula —C(O)—N($R^3$)$R^2$—,
E is a hydrocarbyl radical having 1 to 50 carbon atoms,
$R^2$ is a $C_2$- to $C_{10}$-alkylene radical,
$R^3$ is hydrogen or a $C_1$- to $C_{10}$-alkyl radical which may bear substituents,
k is a number between 1 and 1000,
n is a number from 0 to 4999,
m is a number from 1 to 5000,
n+m is a number from 10 to 5000, with the proviso that a) the molar proportion of the structural units (I) in the polymer is between 0 and 99.9 mol %, and
b) the molar proportion of the structural units (II) in the polymer is between 0.1 and 100 mol % of the repeat units,
by irradiating the hydroxyl-bearing polymer A) containing the repeat structural unit of the formula (I) together with a hydroxycarboxylic acid B1) of the formula (III) or hydroxycarboxylic ester B2) of the formula (IV)

$$HO-E-COOH \quad (III)$$

$$HO-E-COOR^5 \quad (IV)$$

in which $R^5$ is a $C_1$-$C_4$-alkyl radical with microwaves in the presence of water, wherein the reaction mixture is heated by the microwave irradiation to temperatures above 100° C.

2. The process as claimed in claim 1, wherein the hydroxyl-bearing polymer A) further comprises, as well as the structural units of the formula (I), additional structural units derived from further ethylenically unsaturated monomers.

3. The process as claimed in claim 1, wherein the structural units of the formula (I) derive from vinyl alcohol.

4. The process as claimed in claim 2, wherein the hydroxyl-bearing polymer A), in addition to the structural units of the formula (I), further comprises structural units derived from vinyl acetate.

5. The process as claimed in claim 1, in which the carboxylic acid B1) or the carboxylic ester B2) is a mixture of at least one carboxylic acid and at least one dicarboxylic acid or a mixture of at least one carboxylic ester and at least one dicarboxylic ester.

6. The process as claimed in claim 1, in which the reaction mixture used for conversion contains 5 to 98% by weight of water.

7. The process as claimed in claim 1, in which the reaction mixture used for conversion contains 5 to 98% by weight of a mixture of water and one or more water-miscible organic solvents.

8. The process as claimed in claim 7, in which the proportion of the water-miscible organic solvent in the solvent mixture is between 1 and 75% by weight.

9. The process as claimed in claim 1, in which the reaction mixture is heated by means of microwave radiation to temperatures between 110 and 280° C.

10. The process as claimed in claim 1, in which ester-bearing comonomer units of the hydroxyl-bearing polymer A) are transesterified with hydroxycarboxylic acids B1) or hydroxycarboxylic esters B2).

11. The process as claimed in claim 1, in which the microwave irradiation is effected in a flow tube made from microwave-transparent, high-melting material.

12. The process as claimed in claim 11, in which the longitudinal axis of the reaction tube in the direction of propagation of the microwaves is within a monomode microwave applicator.

13. The process as claimed in claim 1, in which the microwave applicator takes the form of a cavity resonator.

* * * * *